United States Patent
Haverkamp

(10) Patent No.: US 11,454,493 B2
(45) Date of Patent: Sep. 27, 2022

(54) METHOD AND ARRANGEMENT FOR DETERMINING A POSITION AND/OR AN ALIGNMENT OF A MOVABLE OBJECT OF AN ARRANGEMENT OF OBJECTS

(71) Applicant: Carl Zeiss Industrielle Messtechnik GmbH, Oberkochen (DE)

(72) Inventor: Nils Haverkamp, Aalen (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 0 days.

(21) Appl. No.: 17/163,545

(22) Filed: Jan. 31, 2021

(65) Prior Publication Data
US 2021/0239454 A1 Aug. 5, 2021

(30) Foreign Application Priority Data
Jan. 31, 2020 (DE) ...................... 10 2020 201 198.2

(51) Int. Cl.
*G01B 11/00* (2006.01)
*G01B 9/02002* (2022.01)
*G01B 11/27* (2006.01)

(52) U.S. Cl.
CPC ........ *G01B 11/005* (2013.01); *G01B 9/02002* (2013.01); *G01B 11/27* (2013.01)

(58) Field of Classification Search
CPC .. G01B 11/005; G01B 11/27; G01B 9/02002; G01B 11/002; G01B 5/008
See application file for complete search history.

(56) References Cited

U.S. PATENT DOCUMENTS 7,602,997 B2   10/2009   Young
7,856,154 B2   12/2010   Young
(Continued)

FOREIGN PATENT DOCUMENTS

DE    102006060716 A1    6/2008
DE    102015205738 A1    10/2016
DE    102018208203 A1    11/2019

OTHER PUBLICATIONS

Star-Hspice, Performing FFT Spectrum Analysis, (1998).
(Continued)

*Primary Examiner* — Violeta A Prieto
(74) *Attorney, Agent, or Firm* — Falk Ewers; Ewers IP Law PLLC

(57) ABSTRACT

A position of a movable object is determined with a capture structure having a profile of an optical property that varies along a surface of the capture structure such that the profile corresponds to a progression of numerical values with local maxima and local minima on an ordered scale of the numerical values, and which is interpretable as a first mathematical function of the location. The optical property varies such that a second mathematical function of the location has an absolute maximum corresponding to a maximum value of the optical property. The optical property has assigned corresponding numerical values such that the progression thereof has the local maxima and the local minima and corresponds to the first mathematical function of the location. The position of the movable object is determined by a frequency analysis of the progression of the numerical values of the second mathematical function of the location.

20 Claims, 4 Drawing Sheets

(56) References Cited

U.S. PATENT DOCUMENTS

| | | | |
|---|---|---|---|
| 8,577,184 | B2 | 11/2013 | Young |
| 8,666,196 | B2 | 3/2014 | Young |
| 10,706,562 | B2 | 7/2020 | Haverkamp et al. |
| 10,748,300 | B2* | 8/2020 | Haverkamp ............ G01B 11/14 |
| 2012/0267802 | A1 | 10/2012 | De Boer et al. |
| 2017/0276468 | A1* | 9/2017 | Ruck ..................... G01B 21/045 |
| 2017/0370690 | A1* | 12/2017 | Held ....................... G01B 5/012 |
| 2018/0018778 | A1* | 1/2018 | Haverkamp .......... G01B 21/042 |
| 2018/0106586 | A1* | 4/2018 | Gruber ................. G01B 21/045 |
| 2019/0362519 | A1 | 11/2019 | Haverkamp |
| 2019/0391372 | A1* | 12/2019 | Haverkamp ............. G02B 9/60 |
| 2020/0114519 | A1* | 4/2020 | Horn ..................... G01B 11/002 |
| 2021/0293584 | A1* | 9/2021 | Ele ..................... G01D 5/34776 |
| 2022/0007216 | A1* | 1/2022 | Asada .................. H04B 17/318 |

OTHER PUBLICATIONS

Software filtering: Windowing General Analog Concepts, http://www.ni.com/productdocumentation5357en/ (2016).

Young et al., Superresolution image reconstruction from a sequence of aliased imagery, Applied Optics, vol. 45, No. 21, Jul. 20, 2006.

Andraka, How to build ultra-fast floating point FFTs in FPGAs, https://www.eetimes.com/how-to-build-ultra-fastfloating-point-ffts-in-fpgas/?page_number=2 (2007).

Krapels et al., Characteristics of infrared imaging systems that benefit from superresolution reconstruction, Applied Optics, vol. 46, No. 21, Jul. 20, 2007.

Hu et al., Super-resolution for flash ladar imagery, Applied Optics, vol. 49, No. 5, Feb. 10, 2010.

Hu et al., Face recognition performance with superresolution, Applied Optics, vol. 51, No. 18, Jun. 20, 2012.

Office Action issued in German Patent Application No. DE 10 2020 201 198.2 to which this application claims priority), dated Sep. 16, 2020 and English language machine translation thereof.

Uzun et al., FPGA Implementations of Fast Fourier Transforms for Real-Time Signal and Image Processing, School of Computer Science, (2003).

Kim et al., Phase-slope and group-dispersion calculations in the frequency domain by simple optical low-coherence reflectometry, Applied Optics, vol. 42, No. 34, Dec. 2003.

Berndt, Using Phase Slope for Arrival Time Determination, scEye Research & Development, Oakland, CA, USA; Johnson, G.C., Schniewind, A.P., University of California, Berkeley, CA, USA, 2006.

U.S. Appl. No. 17/163,543, filed Jan. 31, 2021, Wolfgang Hoegele, Carl Zeiss Industrielle Messtechnik GmbH.

* cited by examiner

METHOD AND ARRANGEMENT FOR DETERMINING A POSITION AND/OR AN ALIGNMENT OF A MOVABLE OBJECT OF AN ARRANGEMENT OF OBJECTS

CROSS REFERENCE TO RELATED APPLICATIONS

This application claims priority to German patent application DE 10 2020 201 198.2, filed Jan. 31, 2020, the entire content of which is incorporated herein by reference.

TECHNICAL FIELD

The disclosure relates to a method for determining a position and/or an alignment of a movable object of an arrangement of objects, in particular of a component of an arrangement of components such as, e.g., a machine or an arrangement of machines. In particular, the arrangement can be a medical treatment apparatus (e.g., an apparatus for irradiating a patient and/or an apparatus for moving a treatment tool. Examples of a machine with at least one movable component are a coordinate measuring machine, a robot, a material application machine (e.g., a 3-D printer) or a machine tool. The arrangement of components and, in particular, the machine can include a drive device for driving a movement of at least one movable component. However, the disclosure also relates to arrangements/components with at least one movable component, the movement of which is also drivable or exclusively drivable by hand. In particular, the disclosure therefore facilitates the determination of a position and/or an alignment of a movable object of one of the aforementioned types of arrangements.

The disclosure further relates to a capture structure, an arrangement of capture structures (more particularly a target; see below) and an arrangement having the capture structure and having a capturing device for optically capturing the capture structure.

BACKGROUND

The capture structure can be/have been connected to the movable object and a capturing device for optically capturing the capture structure can be connected to a reference object that does not move along with the movable object such that the position and/or alignment of the movable object arises or can be determined from the position and/or alignment of the capture structure and, optionally, at least one further capture structure. Therefore, the movable object (e.g., the machine part or the patient to be treated) has at least one capture structure, which is optically captured by the capturing device to determine the position and/or alignment of the movable object. Alternatively or additionally, the capture structure or the capture structures can be/have been connected to the reference object (e.g., a different machine part or a treatment apparatus for treating the patient) that is not moved along with the movable object and the capturing device can be connected to the movable object.

Therefore, the position and/or alignment of the movable object can be determined relative to the reference object. In particular, it is possible to determine the position and/or alignment in relation to a stationary coordinate system or a coordinate system moving along with another movable component or the patient.

The capture of the position and/or the alignment of a movable part of a coordinate measuring machine on the basis of an optical capture of capture structures is generally known from DE 10 2015 205 738 A1, for example.

SUMMARY

In an exemplary embodiment of the disclosure, the position of the movable part and/or alignment thereof can be used for open-loop or closed-loop control of the movement of the movable part.

In particular, the disclosure contains tracking the movement of the movable object in order to determine a number of local degrees of freedom of the movement. The movement tracking contains, in particular, a repeated capture such that the position, the speed and/or the alignment is/are ascertainable in each case from the result of a capture, optionally taking account of the capture results obtained from an earlier movement state and/or a subsequent movement state. The capture may in particular include recording one or more images of at least one capture structure, for example by one or more digital cameras.

The number of degrees of freedom of movement to be captured or number of captured degrees of freedom of movement, and hence also the coordinate axes and/or axes of rotation, in respect of which the position and/or alignment should be established or is established, may be of different magnitude. By way of example, the position can be determined in respect of one, two or three linear axes of the movement or coordinate axes. As an alternative or in addition thereto, the alignment can be determined in respect of one, two or three axes of rotation and/or as an alignment vector in a two-dimensional or three-dimensional coordinate system.

In a specific configuration, a plurality of capture structures form an arrangement of capture structures, wherein the plurality of capture structures are optically captured to determine the position/or alignment of the movable object. In the process, one or more of the capture structures can optionally be captured by the same capturing unit (e.g., digital camera). An arrangement of directly interconnected capture structures, i.e., of capture structures that are not only connected via the movable object or the reference object, is also referred to as a marker or target.

In this description, the capturing device is understood to mean a device having at least one capturing unit. Therefore, the capturing device can include, for example, a single capturing unit such as a digital camera, for example. Alternatively, the capturing device can include an arrangement of capturing units (e.g., digital cameras). Here, one or more capturing units can optionally be directly interconnected. However, it is also possible that at least two capturing units are only indirectly interconnected, for example via connecting elements between various objects of the arrangement of objects.

Optical capture is understood to mean that electromagnetic radiation is captured, said electromagnetic radiation, in particular, corresponding to the movement state of the capture structure. Areal capture structures, i.e., capture structures that extend along an area, in particular a surface, are already known per se. In the case of areal capture structures, only the two-dimensional appearance is important for the capture and evaluation thereof. By way of example, such areal capture structures can be realized as two-dimensional greyscale value distributions or binary distributions. In particular, binary distributions have dark and bright regions, e.g., black and white regions. Examples include one-dimensional barcodes and two-dimensional matrix codes. Areal capture structures, in particular two- } dimensional capture structures, can be, e.g., printed onto a surface (e.g., by inkjet printing), etched into the surface and/or introduced into the surface in any other way by partial material removal and/or applied by material application. Expressed differently, the surface can be structured in such a way that an areal capture structure arises. During the introduction and/or application, a continuous layer with different optical properties can be produced, for example, and/or material can be removed and/or applied in portions of the surface only.

The capture structures can be optimized for their respective application. By way of example, they may contain a code and/or may be combined with a code in order to make these distinguishable from other capture structures. The capture structures and optionally the markers should also be optimized for determining the position and/or alignment of the movable component and for specific applications such as the determination of the movement speed.

In particular, the disclosure contains tracking the movement of the movable object in order to determine a number of (one or more) local degrees of freedom of the movement. In particular, the movement tracking contains a repeated capture of the capture structure or of a plurality of the capture structures such that the position, the velocity (in particular, only the magnitude thereof or, alternatively, the direction thereof, too), the acceleration (in particular, only the magnitude thereof or, alternatively, the direction thereof, too) and/or the alignment of the movable part is/are ascertainable from the result of the capture in each case, optionally taking account of the capture results obtained for an earlier movement state and/or a subsequent movement state. The capture may in particular include, and not only for movement tracking, recording one or more images of the capture structure(s), for example by one or more digital cameras.

Expressed in general, a movement state, in particular the current position, current alignment, current velocity and/or current acceleration, can be determined in respect of a number of spatial degrees of freedom of the movement of the movable part by evaluating the capture information items, i.e., the information items that are/were obtained during a capture process.

In particular, the movable object can be a tool, for example a tactile probe or a sensor, a non-tactile, in particular optical, sensor for determining coordinates of a workpiece, a processing tool (e.g., a mechanical, optical, chemical or other processing tool) for processing a workpiece, a tool for adding material to a workpiece or a medical instrument for an operation. However, it might also be a microscope, for example. By way of example, it might be a surgical microscope or, formulated more generally, a diagnostic tool or instrument. Independently of the specific application, it is often the object to initially determine the position and/or alignment of the capture structure(s), and hence, indirectly, the position and/or alignment of the movable part (e.g., the tool), from the capture. In particular, it is also possible to determine the velocity of the object by integrating the determined acceleration over time and/or to determine the position thereof by integrating the velocity over time.

The number of degrees of freedom of movement to be captured or number of captured degrees of freedom of movement, and hence also the coordinate axes and/or axes of rotation, in respect of which the position and/or alignment should be established or is established, may be of different magnitude. By way of example, the position can be determined in respect of one, two or three linear axes of the movement or coordinate axes. As an alternative or in addition thereto, the alignment can be determined in respect of one, two or three axes of rotation and/or as an alignment vector in a two-dimensional or three-dimensional coordinate system.

If there is capture of the capture structure(s) in at least one image, in particular a digital image, methods of image processing known per se can be resorted to when evaluating the capture information items. In general, the determination of the position and/or alignment of the object (e.g., the tool) actually under observation requires the ability to uniquely identify the object or an object connected therewith (for example, a connected article) or a combination of the two objects. Consequently, the identification must be reliable, and it is advantageous in most cases if this is implemented quickly. If a plurality of objects should be observed simultaneously and, in particular, if the movement thereof should be tracked, the articles must also be uniquely identifiable, or at least distinguishable from one another.

The use of capture structures or markers, which are combined with the actual object to be observed and which are fastened to the latter, for example, is known. The capture structures or markers can be configured in such a way that they are quickly capturable in a reliable and distinguishable manner. The distinguishability relates not only to different movable objects, but also to a single, or each individual, movable object, which should be distinguishable from its surroundings and its background. This can also be ensured by suitably designed capture structures, arrangements of capture structures or markers.

Particularly when controlling movement processes that are based on so-called movement tracking, i.e., which use, e.g., the position and/or alignment determined from the capture information items as a basis for the control, both the capture and the evaluation of the capture information items should be robust, i.e., the susceptibility to errors should be low. Errors may lead to erroneous measurement results, incorrectly processed workpieces, incorrectly produced workpieces and collisions between objects. In medical therapy, corresponding examination errors and treatment errors may arise in the case of capture errors. This applies if, for example, the examination or treatment is carried out at least in part by a robot.

The preceding and the following description also relate, in particular, to the disclosure and configurations thereof.

If the capture information items are two-dimensional information items, as is the case for digital camera images, for example, then it is possible to refer to a viewing direction, in particular the optical axis of the camera, which extends perpendicular to the two-dimensional area of the capture information items. Areal capture structures whose alignment is not equal to the viewing direction can be considered to be rotated about an axis of rotation extending perpendicular to the viewing direction. A problem arising here is that the same distortion or deformation of the appearance of the capture structure arises if the capture structure is rotated from the viewing direction in one rotational direction or in the opposite rotational direction about the aforementioned axis of rotation. Which of two possible alignments the capture structure has is not ascertainable without additional information items. A single image or, formulated more generally, locally two-dimensional capture information items alone is/are insufficient in this respect.

The optical capture of capture structures for determining the position and/or alignment of a movable object is advantageously carried out with imaging methods, i.e., the capture is implemented in spatially resolved fashion at least in respect of one direction. Compared to methods, even optical methods, which track an object purely in punctiform fashion, e.g., with lasers, the realization is simplified, and an object lost during movement tracking can be retrieved more easily. However, there is an increased amount of data when processing image information. Conventional digital cameras which capture two-dimensional images have, e.g., 1024 or 2048 image rows or image columns such that correspondingly many pixels with amounts of data of the order of megabytes have to be processed in order to determine the position and/or alignment of the movable object.

In order to be able to at least determine the position of a movable object quickly from image data of an optical capture and therefore be able to obtain movement tracking which is finely resolved in time with repeated capture and evaluation, as is the case in exemplary embodiments of the present disclosure, a method for determining the position and/or alignment of a movable object, a corresponding arrangement, a capture structure or arrangement of capture structures, and/or a method for producing a capture structure or an arrangement of capture structures are desirable, which facilitate a fast capture and evaluation of the captured information items in respect of the position and/or alignment of the movable object. In particular, industrially suitable computer systems should be able to continuously determine the position and/or alignment of the movable object with a repetition rate of the order of 1 kHz or even higher in the case of a commercially available camera pixel number of 1024×1024 or 2048×2048.

US 2012/0267802 A1 describes a substrate and a method for determining a position in a lithography system. An at least partly reflecting position marker with an arrangement of structures can be present on the substrate. A reflection coefficient of the structures varies along a longitudinal direction of the position marker. The substrate can include a wafer, and so the position marker is formed on the wafer. The position can be measured with a light beam impinging on the substrate, with an amount of energy of a reflected beam being measured. The structures can be substantially rectangular structures, which are spaced apart from one another and arranged in such a way that the reflection intensity of the beam depends on the position of the incident light beam.

Various measures which enable at least some of these aims to be achieved are provided in the following description. The measures can be realized individually or in any combination with one another. Here, the term measure includes, in particular, the configuration of a method for determining a position and/or alignment of a movable object, an arrangement for determining the position and/or alignment, a capture structure or an arrangement of capture structures, a method for producing a capture structure or an arrangement of capture structures and/or any combination thereof. This applies, in particular, to the first and the third of the measures described below. In respect of the second of the measures described below, the term measure includes, in particular, a method for determining a position and/or alignment of a movable object and a corresponding arrangement for carrying out the method and, optionally, also a method for producing the arrangement.

In respect of the first measure, it is provided to use a capture structure for optical capturing, wherein the capture structure has specific features that allow the capture information obtained from capturing the capture structure to be evaluated quickly.

The capture structure has a profile of an optical property that varies along a surface of the capture structure. The optical property can be in particular an emittance, reflectance and/or absorptance with regard to the emission, reflection and/or absorption, respectively, of electromagnetic radiation in at least one wavelength range and/or for at least one discrete wavelength. In many cases, particularly when recording an image of the capture structure with a digital camera, the profile of the optical property is characterized by a local distribution of the radiant flux density of electromagnetic radiation in at least one wavelength range and/or at at least one wavelength of the emitted and/or reflected electromagnetic radiation. The radiant flux density distribution is captured by the capturing device (for example by the sensor elements of the digital camera). In this case, a weighting of the local distribution received by the capturing device can take place on account of the spectral sensitivity of the sensor elements that is not constant over all wavelengths.

Here, the profile of the optical property varies, at least along a surface direction, in such a way that the optical property is expressible by corresponding numerical values in accordance with a specified mapping. The optical property varies, at least along the surface direction, in such a way that the corresponding progression of the numerical values on an ordered scale of the numerical values has a plurality of local maxima and a plurality of local minima. The progression of the numerical values is interpretable as a first mathematical function of the location. Here, the capture structure additionally includes a further feature which substantially contributes to the capture information items being able to be evaluated quickly: Within a local region with at least three local maxima, a second mathematical function, the function values of which include a plurality or all of the local maxima, has an absolute maximum or an absolute minimum. As an alternative or in addition thereto, an absolute maximum or an absolute minimum is located within a local region with at least three local minima which, like a plurality or all of the local minima overall, are values of the third mathematical function of the location.

Such a design of the profile of the optical property in or along the considered surface direction facilitates the determination of the position of the capture structure by frequency analysis (e.g., a Fourier analysis). Firstly, a plurality of local maxima and local minima are present and frequencies corresponding to the distances of the maxima and the minima are particularly pronounced in the frequency domain, as a result of which the frequency spectrum has a corresponding characteristic manifestation. Secondly, a uniquely defined location which is identifiable by the frequency analysis is present in the spatial domain (extending along the considered surface direction) as a result of the absolute maximum or absolute minimum of the second mathematical function and/or as a result of the absolute minimum or absolute maximum of the third mathematical function. By displacing the uniquely defined location in the spatial domain, which corresponds to displacement of the capture structure along the considered surface direction on account of a relative movement between capture structure and capturing device, the frequency spectrum alters.

The frequency analysis can be carried out, in particular, with a transformation of the first mathematical function, or a corresponding mathematical function determined from the captured information items, from the spatial domain to the frequency domain. The transformation of the location-dependent mathematical function from the spatial domain to the frequency domain is typically embodied as Fourier transform, e.g., a discrete Fourier transform (DFT), a fast Fourier transform (FFT) or a Fourier transform for discrete-time signals (DTFT—Discrete-Time Fourier Transform). In the case of the DTFT, the latter is applied to the discrete-location profile analogously to the application—encountered more often in mathematics—in which discrete-time signals are transformed into the frequency domain. In the case of DTFT, a continuous frequency spectrum arises as a result of the transformation.

Fast algorithms are available in particular for these three types of digital Fourier transformations, which algorithms can in particular also be executed with data processors configured specifically for this purpose. These and other digital transformations into the frequency domain can therefore process capture information of the capture structure or of an arrangement of such capture structures, said capture information being generated by at least one digital camera. If the capture structure is located at a different position during and/or after the movement of the movable object, the respective position can be quickly determined by way of the repeated capturing of the capture structure or of the arrangement of capture structures.

In general, the function transformed into the frequency domain, even in the case of a real function, as is the case for the first mathematical function, is a function of complex values, i.e., there is a function with real function values and a function with imaginary function values. As will still be described in more detail in the description of the exemplary embodiments on the basis of the attached figures, the phase of the complex values, in particular, contains the information about the relative position of the uniquely defined location in the spatial domain, at which the extremum of the second mathematical function and/or the extremum of the third mathematical function is located. The phase of the complex values can also be regarded as the angle between the imaginary part and the real part of the complex numbers, which angle is present in a graphical representation of the respective number in a two-dimensional Cartesian coordinate system. When this description refers to the phase of the complex values, this can alternatively also form and/or take account of any other relationship of the respective real part and imagery part of the complex values.

It is typical for the first mathematical function, and hence also (apart from non-linear distortion effects when imaging the capture structure) for the corresponding mathematical function determined from the capture information items, to be a function that is symmetric in the observed surface direction about the uniquely defined location in the spatial domain. A symmetric function is understood to mean that the function values have an equal size, i.e., the optical property has the same value, at points of the function located at the same distance from the point of symmetry in opposite directions. This must only be satisfied to the extent that function values are present. Thus, for example, if a function value is present at a great distance from the point of symmetry in one direction because the capture structure extends accordingly far, it is not necessary for a function value to also be present in the opposite direction. Expressed differently, the point of symmetry need not be located in the center of the capture structure, even though this is preferred.

As will also be described in more detail in the description of the figures, the information about the relative position of the uniquely defined location in the spatial domain, in the case of a symmetrical function, is able to be determined particularly easily by virtue of the first derivative of the function $\arg(X(\omega))$ being formed and the result being output as the position of the location and thus the position of the capture structure. Here, the function arg denotes the phase, X denotes the function transformed into the frequency domain and $\omega$ denotes the frequency. In practice, however, it is typical not to form the function $\arg(X(\omega))$ explicitly, but rather, from the function transformed into the frequency domain, to form for example the first derivative directly from corresponding intermediate results, wherein also at least one higher derivative can be concomitantly taken into account.

The result is therefore a measure for the position of the movable object which is connected to the capture structure or which is connected to the capturing device, which captures the capture structure not moved along with the movable object, wherein, however, the capturing device is moved along.

The disclosure is based on the concept of it being possible to quickly carry out a corresponding evaluation in respect of the frequency domain on account of the aforementioned features of the capture structure—in contrast with the spatial domain. In particular, there is no need to carry out a complex evaluation of large amounts of data in the spatial domain, as is the case in conventional image processing. Rather, the aforementioned features of the capture structure lead to characteristic properties in the frequency domain, which facilitate the determination of the position with little computational outlay.

In particular, the profile of the optical property along the surface direction, i.e., along a direction in which the surface extends, can be periodic with at least one frequency. As a result of the periodicity, the corresponding frequency spectrum is even more pronounced with even larger amplitudes in the frequency ranges of particular interest, and so the speed of the determination can be further increased and/or the accuracy of the determination can be increased.

The derivative of the function $\arg(X(\omega))$ can be formed, in particular, at the frequency of the periodic function in the spatial domain and/or at the frequency at which the statistical distribution function transformed into the frequency domain has its absolute maximum or absolute minimum.

Even if the profile of the optical property in the spatial domain has been/is configured in such a way that a first spatial derivative of the optical property changes continuously, the frequency spectrum will be manifested in such a way that the speed of the evaluation, and hence the time resolution in the case of repeated capture, can be increased and/or the accuracy when determining the position of the movable object can be increased. In both cases of continuous first spatial derivative and periodicity the frequency ranges of little interest in the frequency spectrum have lower amplitudes than without the corresponding configuration.

The specified mapping can already arise when determining the capture information items. By way of example, in the case of a digital camera which captures the profile of the optical property as a brightness profile or profile of the radiation intensity, the pixels of the recorded image each have a numerical value which reproduces the value of the optical property. However, it is also possible that a capture result of the capturing device is processed and, in so doing, the optical property respectively has assigned a numerical value in accordance with the specified mapping. By way of example, this may be the case if a digital camera captures the capture structure in spectrally resolved fashion. In this case, it is conventional for each pixel of the captured image information items to have at least three color values. This facilitates 2 different procedures. By way of example, the profile of the individual color values can be evaluated. In this case, there need not be any further assignment of a numerical value. However, a spectral profile can also be evaluated. In this case, a single numerical value can be respectively assigned to the plurality of color values of the individual pixels, said numerical value being a measure for the radiation spectrum or the radiation wavelength of the radiation that was received by the sensor element of the camera assigned to the pixel.

The mapping of the numerical values to the optical property is specified, in particular, in relation to the capture information items since the numerical values are assigned after the capture or by the capture of the capture structure. However, there consequently also is a mapping to the optical property, which is captured by the capture.

The aforementioned feature of the absolute maximum or the absolute minimum of the second or third mathematical function can be obtained, in particular, by the application of a statistical distribution with a single maximum or a single minimum (such as, e.g., a Gaussian distribution) for the purposes of weighting an initial function with a plurality of maxima and minima. By way of example, the initial function can be a sine function or a cosine function.

In relation to the weighting of an initial function with a statistical distribution, it is therefore typical for the statistical distribution to be symmetric with respect to its maximum or minimum, as is the case in a Gaussian distribution.

Below, reference is repeatedly made to a capture structure which, in relation to the first measure, has the following principal features: the capture structure has a profile of an optical property that varies along a surface of the capture structure, the optical property is expressible by a corresponding numerical value in accordance with a specified mapping, at least at each location along the surface direction of the capture structure, the optical property varies in such a way that the profile of the optical property, which varies along the surface, corresponds to a progression of numerical values with a plurality of local maxima and a plurality of local minima on an ordered scale of the numerical values, which is interpretable as a first mathematical function of the location, the optical property varies along the surface in such a way that a plurality or all of the local maxima are values of a second mathematical function of the location along the surface direction, which has an absolute maximum corresponding to a maximum value of the optical property or an absolute minimum corresponding to a minimum value of the optical property within a local region with at least three local maxima of the first mathematical function of the location, and/or a plurality or all of the local minima are values of a third mathematical function of the location along the surface direction, which has an absolute maximum corresponding to a maximum value of the optical property or an absolute minimum corresponding to a minimum value of the optical property within a local region with at least three local minima of the first mathematical function of the location.

In particular, a method for determining a position of a movable object of an arrangement of objects, in particular of a component of an arrangement of components, e.g., a machine, is provided, wherein at least one capture structure with the aforementioned principal features, which is arranged at the movable object or at an object that is not moved along with the movable object, is optically captured and capture information items are obtained thereby, wherein the optical property captured by the capture information items has assigned the corresponding numerical values in accordance with the specified mapping such that the progression of the numerical values has the plurality of local maxima and the plurality of local minima and corresponds to the first mathematical function of the location, and wherein the position of the movable object in respect of the surface direction is determined by performing a frequency analysis of the progression of numerical values of the second mathematical function of the location and/or the third mathematical function of the location.

Further, an arrangement for determining a position of a movable object of an arrangement of objects, in particular of a component of an arrangement of components, e.g., a machine, is provided, wherein the arrangement includes at least one capture structure with the aforementioned principal features, which is arrangeable at the movable object or at an object that is not moved along with the movable object, and a capturing device for capturing the capture structure, wherein the capturing device is configured to optically capture the capture structure and thereby obtain capture information items, wherein the arrangement includes an evaluation device, wherein the evaluation device or the capturing device is configured to assign to the optical property captured by the capture information items the corresponding numerical values in accordance with the specified mapping such that the progression of the numerical values has the plurality of local maxima and the plurality of local minima and corresponds to the first mathematical function of the location, and wherein the evaluation device is configured to determine the position of the movable object in respect of the surface direction by performing a frequency analysis of the progression of numerical values of the second mathematical function of the location and/or the third mathematical function of the location.

In particular, the arrangement is configured to carry out the method for determining a position and/or alignment of a movable object in one of its configurations. The evaluation device and the capturing device are configured accordingly.

The evaluation device has an output for outputting the position of the movable object and/or an orientation of the movable object determined using the position. The output can be connected in particular to an output device for outputting the information to at least one user and/or to a control device for open-loop and/or closed-loop control of the movement of the movable part. Accordingly, the method can be configured such that the position and/or orientation are/is output to the control device and used by the latter for open-loop and/or closed-loop control of the movement of the movable part. Alternatively or additionally, it is possible, from repeatedly determining the position and/or orientation, to determine the velocity and/or acceleration of the movable part and to output this information to the control device and/or to the output device. The output can be implemented in the form of analogue and/or digital information items and/or data.

Further, a corresponding capture structure or an arrangement of capture structures is provided, which serves to determine a position and/or alignment of a movable object of an arrangement of objects by virtue of the capture structure being connected either to the movable object or to a capturing device that is not moved along with the movable object, the capture structure being captured and corresponding capture information items in respect of the position of the movable object being evaluated, in particular for determining a position of a component of an arrangement of components such as, for example, a machine, wherein the capture structure or, in the case of the arrangement, each of the capture structures of the arrangement has the aforementioned principal features.

The capture structure can be used when carrying out the method and as a part of the arrangement configured to carry out the method. Further, the capture structure can be part of an arrangement of capture structures in one of the configurations which are described in this description.

Further, the scope of the disclosure in the context of the first measure includes a method for producing a capture structure and an arrangement of capture structures, which serves to determine a position of a movable object of an arrangement of objects, wherein the capture structure or the arrangement of capture structures is produced in such a way that it has the features described in this description.

The scope of the disclosure also includes a method for producing an arrangement which serves to determine a position and/or alignment of a movable object of an arrangement of objects, in particular of a component of an arrangement of components such as, e.g., a machine, wherein the arrangement is equipped with at least one capture structure, wherein the capture structure serves to be arranged at the movable object or at an object that is not moved along with the movable object, wherein the arrangement is equipped with at least one capturing device for capturing the capture structure or for capturing at least one of the capture structures, wherein the capturing device has been/is configured to optically capture the capture structure and thereby obtain capture information items, wherein the at least one capture structure has the aforementioned principal features, wherein the arrangement is equipped with an evaluation device, wherein the evaluation device or the capturing device has been/is configured to assign to the optical property captured by the capture information items the corresponding numerical values in accordance with the specified mapping such that the progression of the numerical values has the plurality of local maxima and the plurality of local minima and corresponds to the first mathematical function of the location, and wherein the evaluation device has been/is configured to determine the position of the movable object in respect of the surface direction by performing a frequency analysis of the progression of numerical values of the second mathematical function of the location and/or the third mathematical function of the location.

In particular, the production method can be configured in such a way that configurations of the arrangement, which are described in this description, are produced. Also, the production method can be configured in such a way that the at least one capture structure is arranged at the movable object or at the object that is not moved along with the movable object and the capturing device is arranged at the object that is not moved along with the movable object or at the movable object. Further, the evaluation device can be part of a control device for controlling the operation of a machine, which has the movable object as a machine part, or of a control device for controlling the operation of an apparatus for examining and/or treating a patient.

As described, the capturing device is arranged at the object that is not moved along with the movable object or at the movable object. If the capturing device has a plurality of capturing units and a plurality of capture structures are present, this also concomitantly includes the case that at least one first capturing unit of the capturing device is connected to the object not moved along with the movable object and at least one second capturing unit is connected to the movable object. The at least one first capturing unit then captures at least one capture structure arranged at the movable object and the at least one second capturing unit then captures at least one capture structure arranged at the object that is not moved along.

In particular, the capture structure can be part of an arrangement of capture structures, of a marker and/or of a marker arrangement. In addition to the capture structure or the plurality of capture structures, a marker also includes further material that is not part of a capture structure. By way of example, at least one capture structure can be applied on and/or introduced in a carrier material typically a planar carrier material, of a marker and the marker can have been/be fastened to the movable object or the reference object.

The term structure is used since the structure extends over a local region that is to be captured in a spatially resolved manner in order to obtain the capture information required for position determination and/or for determining the resolution. In this case, the capture structure, i.e., the structure to be captured, can be configured in one-dimensional, two-dimensional or three-dimensional fashion, as mentioned. For capturing the capture information items, the capture structure is captured in any case in an at least one-dimensionally locally resolved manner.

The capture structure has a profile of an optical property that varies along a surface of the capture structure. With the optical capturing with a local resolution, the varying profile of the optical property at least along a surface direction of the capture structure can thus be captured and is actually captured when the method is carried out.

In this description, inkjet printing is mentioned as an example for producing the capture structure with its varying profile of the optical property. In particular, a continuously changing profile of greyscale levels or greyscale values and thus of the brightness of the surface can be produced with inkjet printing. Inkjet printing has the advantage that it can be produced with very fine resolution and therefore acts like a continuously varying profile despite the fact that digital printing is involved. Therefore, the profile is continuous, not only in the case of inkjet printing, between immediately successively local maxima and local minima, particularly within this meaning. As an alternative to inkjet printing, some other digital printing method, e.g., laser printing, can be used not just during the production of a greyscale value profile. Furthermore, for producing the capture structure, alternatively or additionally, a display can be used, with which the capture structure is represented during capturing. In particular, a display or an arrangement of displays with organic light emitting diodes (OLED) comes into question. It is also possible to project an image onto a surface of a marker, wherein the structure projected onto the surface of the marker forms the capture structure by itself or together with permanent optical properties of the marker. The projected structure is referred to as non-permanent since the projection can be started and ended.

Therefore, if inkjet printing and/or a greyscale value profile or bright-dark profile are/is mentioned in this description as an example of the concrete configuration of the capture structure, the other production methods and realizations for at least temporary, non-permanent, or permanent production of the capture structure, as mentioned above, are alternatively appropriate in each case. In particular, the capture structure can have a colored configuration and it is consequently possible to assign numerical values in respect of different hues or wavelengths, in each case as per a separate specified mapping, which numerical values each have maxima and minima, on the basis of which the position of the movable part is respectively determined in the manner according to an aspect of the disclosure. Information about different optical properties can thus be contained in the same surface region of the capture structure and be evaluated. As an alternative or in addition thereto, in contrast to the description above, rather than the optical property varying in each case at a concrete wavelength or in a concrete wavelength range in the manner according to the disclosure (for example the color intensity can vary) and being evaluated, the profile of the optical property along the surface direction can be a spectral profile, i.e., the wavelength varies with the location, and this spectral profile can have maxima and minima in the manner according to an aspect of the disclosure, the latter being evaluated in order to determine the position.

Particularly in the case of a projected structure, but also in other cases, it is typical in the case of binary contrasts in the capture structure and a digital imaging capture of the capture structure that the pixels of the captured images are large in relation to the dimensions of the binary units (e.g., cells) of the capture structure, e.g., being one tenth or less. In the case of non-binary profiles of the capture structure (e.g., in the case of greyscale value OLED displays), the ratio can also be larger, up to 1:1, even though this is not typical.

Formulated more generally, the optical property can be, in particular, a reflectance and/or an absorptance in respect of the reflection or absorption of electromagnetic radiation in a wavelength range or for a certain wavelength, a radiant flux density of emitted and/or reflected electromagnetic radiation in a wavelength range or at a certain wavelength or a wavelength or a wavelength range of emitted and/or reflected electromagnetic radiation.

The profile of the optical property that varies along the surface of the capture structure can have certain features which are described in more detail below.

A typical feature is a continuously changing first spatial derivative of the optical property. In the case of the spatially discrete optical capture, this means that, in the case of discrete sampling of the local profile of the optical property, all successive sampling points do not belong to the same, possibly present local section with a locally constant optical property of the capture structure.

This is because the capture structure can optionally be realized by, for example, short local sections with a constant optical property, for example by individual or a plurality of so-called dots of an inkjet printed image. However, in fact, such dots of an inkjet printed image are not punctiform in the mathematical sense but have a local extent. In particular, the dots can also be composed of a plurality of partial dots, as is known from inkjet printing. Two adjacent small portions of the capture structure, which are generated by different inkjet printing dots, are not precluded from having the same value of the optical property. However, the spatial resolution when producing the capture structure is so fine and so much finer than the local resolution during the optical capture of the capture structure that two sampling points located next to one another never belong to the same constant local profile of the optical property of the capture structure during the optical capture. Therefore, for capturing the optical property, the capture structure appears in such a way that the first spatial derivative of the optical property changes continuously.

A continuously changing first local derivative of the optical property is advantageous in that frequency components are missing from the frequency spectrum or the frequency components have a smaller amplitude than in the case of a discontinuously changing optical property. The lack of a discontinuous change of the optical property at least in one or more local portions of the capture structure and/or at least in portions along the aforementioned surface direction of the capture structure therefore corresponds to a continuously changing profile of the optical property. Therefore, this feature is also referred to below by using the expression "continuous profile" or "continuously changing profile".

As will still be explained in more detail below, such a continuous profile has the advantage over a discontinuously changing profile of the optical property that the frequency spectrum of the profile has a larger amplitude ratio of the used signal, from which the position of the movable part is ascertainable, to the signal that is not usable for determining the position. If the unusable signal is referred to as noise, this can therefore be referred to as an SNR (signal-to-noise ratio). Discontinuities in the profile of the optical property, which are also referred to as edges, generate corresponding amplitudes, which can be considered to be noise, at a plurality of frequencies in the frequency spectrum.

In particular, it is typical for the profile of the optical property of the capture structure that varies along the surface of the capture structure to be periodic. This means that the profile has a correspondingly pronounced frequency in the frequency spectrum. In particular, the profile can vary between the maxima and the minima at a single frequency, as would be the case in the case of a sinusoidal profile. However, the first mathematical function of the location cannot be a sinusoidal function since the maxima and/or minima, or at least some of them, have an absolute maximum or an absolute minimum in accordance with the second mathematical function or the third mathematical function of the location, and hence not all maxima correspond to the same numerical value and/or not all minima correspond to the same numerical value. However, it can be formed from a sinusoidal function, as will still be described in more detail below.

The periodicity of the first mathematical function of the location may mean that at least a plurality of the local maxima and/or at least a plurality of local minima of the progression of the numerical values have a constant distance from one another. Here, the aforementioned distance can be the respective distance between two maxima or minima that are closest neighbors or the distance between two maxima or minima that are not closest neighbors. In the case of the periodicity of only one frequency, the distances between two respective adjacent maxima and two respective adjacent minima are constant. However, as already indicated, the periodicity of the profile can also be a multiple periodicity, i.e., a periodicity in respect of a plurality of frequencies. By way of example, such a multiple periodicity can be obtained by the superposition of a plurality of sine functions, wherein the profile, like in the case where it is formed from a single sine function (or cosine function), too, is typically also formed by a superposition of a function with a single maximum or a single minimum. The function with a single maximum or a single minimum leads to the second mathematical function of the location having the absolute maximum or the absolute minimum and/or to the third mathematical function of the location having the absolute maximum or the absolute minimum.

A periodically varying profile of the optical property and, accordingly, of the first mathematical function of the location is advantageous in that the frequency corresponding to the period is present with a high amplitude in the frequency spectrum. The corresponding frequency or the corresponding frequencies are therefore identifiable with great reliability during the frequency analysis and/or the evaluation of the frequency spectrum.

In particular, knowledge about the configuration of the capture structure can optionally be used during the evaluation. By way of example, should it be known that the capture structure has a profile of the optical property that is periodic in a single frequency, then it is possible to expect an amplitude of a single frequency manifested accordingly in the frequency spectrum. If such a pronounced frequency is missing, this can be considered an indication for an error when capturing the capture structure or when evaluating the capture information items. A corresponding statement applies if the capture structure is multiply periodic. The lack of one or more pronounced frequencies then is an indication of an error. Additionally, in the case of a plurality of frequencies, a check can be carried out on the basis of the known ratio of two or more frequencies as to whether this ratio is also contained in the frequency spectrum determined from the capture information items. Secondly, except for the case of telecentric imaging of the capture structure on the capturing device, it cannot be expected that one or more known frequencies, which is/are contained in the capture structure, are found exactly at the corresponding position in the frequency spectrum. Non-telecentric imaging leads to an expansion or compression of the spatial scale.

The periodicity of the profile of the optical property is also advantageous in that it is freely selectable within certain boundaries given by the spatial resolution during the production of the capture structure and by the capture of the capture information items and the evaluation thereof. Therefore, at least one frequency can be specified during the production of the capture structure, according to which frequency the profile of the optical property of the capture structure has a periodic configuration. Other effects can be taken into account when choosing at least one of the frequencies or the frequency, which effects have an effect on the frequency spectrum of the capture information items. These include an optical distortion during generation of the capture information items, an inhomogeneous illumination of the capture structure in the wavelength range of the electromagnetic radiation used for optically capturing the capture structure, the relative movement of capture structure and capturing device that takes place, under certain circumstances, during the capturing of the capture information items, alterations and/or inhomogeneities of the space between the capture structure and the capturing device (such as, e.g., movement of the air and/or sound waves in the air in said space) and/or the process of processing the capture information items for the purpose of determining the position of the movable object. In particular, the latter includes, in so far as applicable, reading out and processing the digital capture information items generated by one or more cameras as capturing device on the basis of the capturing of the capture structure and optionally further capture structures.

In order to advantageously choose the frequency or frequencies when generating the capture structure, it is possible, in particular, to proceed by carrying out a reference capture and/or a reference evaluation of the capture structure or of another capture structure or of at least a surface region of the movable object or of a reference object. As a result, the effect of the involved effects on the frequency spectrum of the capture information item or of the evaluation result of the evaluation of the capture information items is determined. Typically, noise components associated with the respective effect or the effects are contained in the frequency spectrum. The frequency or the frequencies for producing the capture structure can be advantageously chosen in such a way that it/they is/are located in different frequency regions to the effects (e.g., the noise components) of the aforementioned effects or of the aforementioned effect in the frequency spectrum. Here, it is optionally also possible to take account of the fact that the frequency or frequencies can change within certain boundaries, which are specified by the variation of the distance of the capturing device from the capture structure, on account of a non-telecentric capture of the capture structure.

The frequency spectrum can be processed in such a way that noise components are reduced or eliminated when evaluating the capture information items and, in particular, when performing the frequency analysis of the progression of the numerical values of the first mathematical function of the location, and not only if the frequency is specified as outlined above when producing the capture structure. In particular, it is possible to apply appropriate frequency filters, such as, e.g., low-pass filters, high-pass filters or band-pass filters, and/or undertake weighting of frequency components in the frequency spectrum which, in particular for amplification of the signal of the profile of the optical property of the capture structure are based on the presence of the capture structure and/or lead to the damping or elimination of the effects of the aforementioned other effects or at least of one of these effects.

It is therefore advantageous in any case to determine frequency components in respect of at least one of the aforementioned effects, typically by varying the corresponding cause of the effect, when specifying at least one frequency during the production of the capture structure or even without such a specification. To render the effects of the effects identifiable it is possible, for example, to successively use different optical devices when capturing the capture information items and/or alter a property of the optical device (e.g., the focal length), alter the illumination of the capture structure, use different digital cameras, alter the sequence of the exposure time intervals of various sensor elements of a digital camera matrix (for example, at least partly simultaneous integration time intervals on the one hand and rolling shutter methods on the other hand), carry out the relative movement of the capturing device and the capture structure at different velocities, in particular including a velocity of zero, and respectively capture and evaluate capture information items and/or perform capture information items at different of states of the space between the capture structure and the capturing device (e.g., temperature, air pressure and movement of the air in the space).

The entire surface of the capture structure can extend along a plane, in particular. However, the term surface direction can be used not only in this case, but also for example if the surface extends in a curved fashion. In this case, the surface direction is also curved. A surface extending along a plane is preferred because the curvature may result in an, in particular non-symmetrical, distortion during the capturing of the capture structure and the frequency spectrum is therefore altered.

The capture structure or each of the capture structures can have a one-dimensional or two-dimensional variation of the optical properties with the features according to the disclosure. In the case of a two-dimensional variation with the features according to the disclosure, the optical property varies in two mutually perpendicular directions along the surface, in each case in such a way that the first mathematical function has a plurality of local minima and of local maxima and the second and/or third mathematical function has the absolute maximum or the absolute minimum. In the case of an arrangement of capture structures, each capture structure can have a one-dimensional variation, each capture structure can have a two-dimensional variation, or a subset of the capture structures can have a one-dimensional variation and another subset can have a two-dimensional variation. It is typical for at least a subset of the capture structures to have a one-dimensional variation or all capture structures (although only a single capture structure may be present) can have one-dimensional variation.

In particular, the capture structure can have a first surface direction, along which the optical property varies in such a way that the first mathematical function has the plurality of local maxima and the plurality of local minima, wherein the capture structure has a second surface direction, which extends transversely to the first surface direction and along which the optical property does not vary in such a way that a corresponding first mathematical function has a plurality of local maxima and a plurality of local minima. Typically, a plurality of local maxima and a plurality of local minima are not present in only one surface direction of the capture structure.

In particular, the capture structure appears as an arrangement of a plurality of parallel stripes on account of the local maxima and the local minima, with the stripes extending in the second surface direction. The optical property can be constant in each case along the profile of these stripes. Alternatively, the optical property can also vary along at least the profile of one of these stripes or of all of these stripes and, for example, can have an absolute minimum or an absolute maximum in a central region of the capture structure in respect of the respective stripe and can increase on both sides of the absolute minimum or continuously decrease on both sides of the absolute maximum. If this description refers to an increase or decrease in the optical property, this always relates to the corresponding numerical values, which can be assigned or have been assigned in accordance with the specified mapping.

On account of the fact that the optical property does not have a plurality of maxima and minima along the second surface direction, it is possible to draw conclusions about the alignment of the capture structure. This in turn renders it possible to determine the alignment of the movable object. By way of example, it is possible to evaluate the profile of the optical property along a plurality of different surface directions and it is possible to determine the surface direction in which the distances between the local maxima and local minima are minimal (this is the first surface direction, in particular) or in which surface direction there are no local maxima and local minima present (this is the second surface direction or one of the second surface directions). In any case, the determined surface direction is a signalized direction and, when determining the alignment of the movable object, it is possible to use, in particular, prior knowledge about the direction of the movable object or in respect of the reference object that does not move along with the movable object in which this signalized direction extends.

In principle and not only in the above-described configuration of the capture structure in respect of the first and second surface directions, it is typical that a plurality of the capture structures are present and the various capture structures each have the variation of the optical property (properties) according to the disclosure. Here, a plurality of the capture structures can be part of the same marker and/or a plurality of the capture structures can be part of different markers. In both cases, independently of the belonging of the capture structures to a marker, the plurality of capture structures can form an arrangement which is able to be captured at the same time by the same capturing unit; i.e., in particular, the capturing unit generates a common image of the plurality of capture structures. However, this does not mean that the capture needs to take place at exactly the same time. Rather, the capture of the plurality of capture structures can be implemented continuously, for example in each case along a sensor line and in line-by-line fashion, for example in the case of a digital camera, the sensor elements of which capture objects using the rolling shutter method. However, it is also possible for at least one of the plurality of capture structures to be captured by a separate image, for example by the same or a different capturing unit. Further, it is possible that at least one capture structure is not able to be captured by the same capturing unit as another capture structure. By way of example, this is the case when the surfaces of the capture structures each extend along a plane (as is generally typical) and the surfaces of two capture structures extend perpendicular to one another or are arranged on opposite sides of the movable object or of the reference object. Nevertheless, it is possible overall to determine the position and/or alignment of the movable object in respect of a plurality of degrees of freedom of the movement by the evaluation according to the disclosure of even such a plurality of capture structures. This is possible, in particular, when the positions and alignments of a plurality of capturing units, which are required for capturing all capture structures to be captured, and the positions and alignments of the capture regions of the capturing units are known and are used for the combination of the evaluation results from the evaluation of individual capture structures or individual arrangements of capture structures. As a result, it is possible to combine the evaluation results, in particular in respect of a single 2-dimensional or 3-dimensional coordinate system. This coordinate system can be a stationary coordinate system, within which the movement of the movable object occurs.

In particular, the above-described feature according to which the capture structure has a second surface direction, which extends transversely to the first surface direction and along which the optical property does not vary in such a way that a corresponding first mathematical function has a plurality of local maxima and a plurality of local minima, can be present in a plurality of capture structures and can be used to determine the position and/or alignment of the movable object in respect of a plurality of coordinate axes, in particular for determining the position and/or alignment in a plane or in three-dimensional space.

Therefore, according to one configuration, a plurality of the capture structures can be optically captured and, as a result thereof, it is possible to obtain corresponding capture information items, wherein, in respect of at least one pair of capture structures present, the first surface directions extend transversely to one another and/or the second surface directions extend transversely to one another. Here, the corresponding numerical values can be assigned to the optical property captured by the capture information items for each capture structure of the pair present, and so the progression of the numerical values is obtained in each case in respect of at least one surface direction of the capture structure. The progression of the numerical values is evaluated in respect of at least one surface direction of the capture structure for each capture structure of the pair present, said surface direction consequently being an evaluation device of the capture structure, wherein a first evaluation device of a first capture structure of the pair differs from a second evaluation device of a second capture structure of the pair. In particular, this procedure is possible for various pairs of capture structures, which each have the aforementioned features in pairwise fashion.

As already indicated, the optical property can likewise vary along the second surface direction, with this variation typically only having a single maximum or minimum, particularly typically only a single maximum in a central region of the capture structure. Here, the profile of the optical property along the second surface direction is typically symmetric with respect to the maximum or minimum. The corresponding two-dimensional dependence of the optical property can typically be generated computationally by way of a two-dimensional function which is periodic (e.g., with a sinusoidal or cosine-type function in respect of a surface direction) with a constant amplitude in respect of one surface direction (e.g., the first surface direction) and which is constant at each point of the surface direction in the surface direction extending perpendicular thereto. A two-dimensional statistical distribution with a single maximum or a single minimum is superimposed on this initial function, wherein the distribution is typically symmetric with respect to the maximum or minimum in all surface directions, i.e., it is point symmetric. This superposition can also be referred to as weighting of the initial function or of the function values thereof and can be achieved mathematically, for example, by way of the function values of the initial function being multiplied by those of the statistical distribution. The statistical distribution is typically a normal distribution. Instead of a sine function or a cosine function as an initial function, it is also possible to use a superposition of a plurality of sine and/or cosine functions with different frequencies as an initial function. Naturally, other, in particular continuous, periodic functions or the superpositions thereof can also be used as an initial function.

If the variation of the optical property is realized in this way, it is possible, taking account of the knowledge about the two-dimensional variation, to draw conclusions about the relative position and/or alignment of the surface direction along which a capture of the capture structure has taken place and along which corresponding numerical values have been obtained as a one-dimensional function of the location. The progression of the numerical numbers has fewer local minima and local maxima, the more twisted the captured surface direction is in relation to the first surface direction, i.e., the larger the angle is between the two surface directions. The larger the distance of the captured surface direction from the local maximum or local minimum, the smaller the amplitude of the second or third mathematical function in the spatial domain and hence, accordingly, the smaller the amplitude of the used signal for determining the position by performing a frequency analysis.

As described below, variations of the optical property of capture structures can be designed in such a way that the identity of a specific capture structure can be determined on the basis of the frequency analysis, i.e., the evaluation of the frequency spectrum. Typically, the capture structures are therefore configured differently and, when evaluating the capture information items from the capture of a plurality of capture structures, there is an identification of at least one of the capture structures using prior knowledge about the configuration of the capture structure(s). In particular, the variation of the optical property as a function of the location in the case of the various capture structures can be configured in such a way in each case that it corresponds to a weighting of an initial function, in particular a periodic initial function, with a function of a statistical distribution, wherein, however, the phase angle of the initial function and of the statistical distribution function relative to one another are chosen differently in the various capture structures. By way of example, in the case of an arrangement of capture structures, the identification allows the alignment of the arrangement to be determined.

However, the differently aligned first and second surface directions in various capture structures are only one option for configuring capture structures differently and for using these differences to determine the position and/or alignment of the movable object, in particular in respect of a plurality of degrees of freedom of the movement. Further options, which can be used individually, in combination with one another and/or in combination with the above-described option, are configuring different capture structures with different distances between the local maxima and local minima and/or configuring the variation of the optical property in accordance with a second and/or third mathematical function of the location with a different gradient and/or characteristic.

This configuration with different distances between the local maxima and minima means different period lengths in the case of the periodic variation of the optical property and hence the presence of high amplitudes at different frequencies in the frequency spectrum. The configuration of the respective mathematical function of the location with a different gradient can be achieved, for example, by weighting a periodic function or any other mathematical function which has a plurality of maxima and minima with different distribution widths of a statistical distribution function, for example by weighting with, in each case, a Gaussian distribution, albeit with different standard deviations.

The second measure described below is based, in particular, on the same problem as a first measure: An arrangement for determining a position and/or alignment of a movable object and a corresponding method for operating the arrangement and, optionally, also a method for producing the arrangement are sought after, which facilitate a quick capture and evaluation of the captured information items in respect of the position and/or alignment of the movable object.

It is provided to divide the capture information items, which were obtained when capturing a capture structure or a plurality of capture structures and which were optionally already processed further, into subsets and to evaluate the subsets with a plurality of data processors. In particular, in this way, each of the plurality of data processors determines a partial result of the position and/or alignment of the movable object for a subset. Then, the partial results can be obtained and combined, in particular by a data processing device of the same arrangement, and so an overall result is obtained for the position and/or alignment of the movable object.

It is typical for the at least one capture structure to have the principal features mentioned above in the description of the first measure (or the capture structure to be configured accordingly) and for the position and/or alignment of the movable object to be determined as described above in the description of the first measure or the arrangement to be configured accordingly.

In particular, each of the data processors performs a frequency analysis for the subset supplied thereto. To this end, the data processor can carry out, in particular, a digital transformation (for example, a DFT or FFT) into the frequency domain of the spatially dependent information items contained in the subset and can evaluate the transformed information items such that the partial result is obtained. However, it is also possible that each of the data processors only carries out, e.g., the digital transformation into the frequency domain for the subset supplied thereto and that the frequency analysis is performed by a subsequent unit, in particular for a plurality of the information items transformed into the frequency domain.

In particular, the capturing device can include one or more digital cameras, which each have a one-dimensional or two-dimensional arrangement of sensor elements for producing a one-dimensional or two-dimensional digital image. Then, the subsets can most expediently respectively be a line or column of the image generated by the digital camera or one of the digital cameras, which image was obtained by capturing at least one capture structure as capture information items. Typically, each subset contains information items about the entire respective line or column and the data processor processes the spatially dependent information items in respect of the entire capture region, which is captured in the line or column.

In the case of a two-dimensional digital image, the captured information items from each line and each column are typically respectively supplied as a subset to one of the data processors for processing and evaluation purposes.

Typically, the partial results for the position of the movable object from processing and evaluating the information items from a plurality of lines and/or a plurality of columns are combined with one another and the position and, optionally, also the alignment of the movable object is determined therefrom. By way of example, in the case of a capture structure already described in relation to the first measure, which capture structure has the described principal features in respect of one surface direction but not in respect of two surface directions extending perpendicular to one another, it is possible, in general, to evaluate each line and each column of the capture information items and it is possible to obtain a value of the position of the movable object. Only in the case where the profile of the lines or the columns corresponds to a surface direction of the capture structure which does not contain the information items about the position of the movable object or only contains these information items inaccurately does the processing and evaluation in respect of the line or the column yield no usable partial result. In the above-described example of a capture structure with a first surface direction, in respect of which the above-described principal features are present, and a second surface direction, which extends transversely to the first surface direction and in respect of which the above-described principal features are not present, it is not possible to evaluate lines or columns in the fashion of the first measure if they extend in the second surface direction or parallel thereto.

In particular, each of the data processors can be configured to carry out a frequency analysis when evaluating the progression of the numerical values of the subset by evaluating the second mathematical function of the location and/or the third mathematical function of the location and to determine the position of the capture structure and consequently output the position of the movable object in respect of the surface direction as a partial result.

The method for operating the arrangement arises from the description of the arrangement and the configurations thereof. In particular, the data processors process the received subsets independently of one another, carry out a frequency analysis of the respective subset and respectively output a partial result for the position and/or alignment of the movable part.

In particular, the second measure can be defined by the following exemplary embodiments:

Exemplary embodiment 1: An arrangement for determining a position and/or alignment of a movable object of an arrangement of objects, in particular of a component of an arrangement of components such as, e.g., a machine, wherein:
the arrangement includes at least one capture structure, which is arrangeable at the movable object or at an object that is not moved along with the movable object, and a capturing device for capturing the capture structure,
the capturing device is configured to optically capture the capture structure and thereby obtain capture information items,
the at least one capture structure has a profile of an optical property that varies along a surface of the capture structure,
the optical property is expressible by a corresponding numerical value in accordance with the specified mapping, at least at each location along a surface direction of the capture structure, such that a progression of the numerical values, which corresponds to the profile of the optical property, is interpretable as a first mathematical function of the location,
the arrangement includes an evaluation device, wherein the evaluation device or the capturing device is configured to assign to the optical property captured by the capture information items the corresponding numerical values as per the specified assignment,
the evaluation device is configured to determine the position and/or alignment of the movable object by performing a frequency analysis on the progression of numerical values, wherein the evaluation device includes a plurality of digital data processors, which each have an input for receiving a subset of the assigned numerical values, and wherein the evaluation device with the digital data processors is configured to process the subsets received by the digital data processors independently of one another by carrying out a frequency analysis of the respective subset and in each case output a partial result for the position and/or alignment of the movable part.

Exemplary embodiment 2: The arrangement according to exemplary embodiment 1, wherein the subsets each have spatially dependent information items, wherein the data processors are configured to transform the spatially dependent information items within the received subset into the frequency domain.

Exemplary embodiment 3: The arrangement according to exemplary embodiment 1 or 2, wherein the subsets each have the numerical values of the first mathematical function, which have been/are obtained from exactly one line or column a digital image of the capturing device embodied as a digital camera or as an arrangement of digital cameras.

Exemplary embodiment 4. A method for determining a position and/or alignment of a movable object of an arrangement of objects, in particular of a component of an arrangement of components such as, e.g., a machine, wherein:
the capturing device optically captures at least one capture structure, which is arrangeable at the movable object or at an object that is not moved along with the movable object, and generates corresponding capture information items,
the at least one capture structure has a profile of an optical property that varies along a surface of the capture structure,
the optical property is expressible by a corresponding numerical value in accordance with the specified mapping, at least at each location along a surface direction of the capture structure, such that a progression of the numerical values, which corresponds to the profile of the optical property, is interpretable as a first mathematical function of the location, an evaluation device or the capturing device assigns to the optical property captured by the capture information items the corresponding numerical values as per the specified assignment, the evaluation device determines the position and/or alignment of the movable object by performing a frequency analysis on the progression of the numerical values, a plurality of digital data processors of the evaluation device each receive a subset of the assigned numerical values, and the digital data processors process the subsets received by the digital data processors independently of one another by carrying out a frequency analysis of the respective subset and in each case output a partial result for the position and/or alignment of the movable part.

Exemplary embodiment 5: The method according to exemplary embodiment 4, wherein the subsets each have spatially dependent information items and the data processors transform the spatially dependent information items within the received subset into the frequency domain.

Exemplary embodiment 6: The method according to exemplary embodiment 4 or 5, wherein the subsets each have the numerical values of the first mathematical function, which are obtained from exactly one line or column of a digital image of the capturing device embodied as a digital camera or as an arrangement of digital cameras.

Exemplary embodiment 7: A method for producing an arrangement which serves to determine a position and/or alignment of a movable object of an arrangement of objects, in particular of a component of an arrangement of components such as, e.g., a machine, wherein:

at least one capture structure, as part of the arrangement, is arranged at the movable object or at an object that is not moved along with the movable object, a capturing device is arranged at the object that is not moved along with the movable object or at the movable object for the purposes of capturing the capture structure, the capturing device is configured to optically capture the capture structure and thereby obtain capture information items, the at least one capture structure has a profile of an optical property that varies along a surface of the capture structure, the optical property is expressible by a corresponding numerical value in accordance with the specified mapping, at least at each location along a surface direction of the capture structure, such that a progression of the numerical values, which corresponds to the profile of the optical property, is interpretable as a first mathematical function of the location, the arrangement includes an evaluation device, wherein the evaluation device or the capturing device is configured to assign to the optical property captured by the capture information items the corresponding numerical values as per the specified assignment, the evaluation device is configured to determine the position and/or alignment of the movable object by performing a frequency analysis on the progression of the numerical values, and the evaluation device is equipped with a plurality of digital data processors, which each have an input for receiving a subset of the assigned numerical values, and wherein the evaluation device with the digital data processors is configured to process the subsets received by the digital data processors independently of one another by carrying out a frequency analysis of the respective subset and in each case output a partial result for the position and/or alignment of the movable part.

In particular, the plurality of data processors can be operated in parallel, and so the subsets can be processed and evaluated in parallel. What is not precluded here is that more than one subset is supplied to a specific data processor and processed and evaluated by the latter. However, it is typical that a data processor is present for each subset such that all subsets are processed and evaluated in parallel. By way of example, in the case of a two-dimensional digital image with a number of lines and a number of columns, the information items can be subdivided into subsets in such a way that each subset corresponds to exactly one line or one column and there can be at least as many data processors as there are lines and columns. Therefore, all subsets can be processed in parallel by one data processor in each case.

The third measure described below is based, in particular, on a similar problem as the first measure: A method for determining an alignment of a movable object, an arrangement for determining the alignment of a movable object and an arrangement of capture structures are sought after, which facilitate a fast capture and evaluation of the captured information items in respect of the alignment of the movable object.

DE 10 2018 208 203 A1, in which a target body having a plurality of markers is described, can be mentioned in respect of the prior art. Together, the markers form a target for optically capturing and for determining a position and/or an alignment of the target body from the captured markers. Here, the target body has a plurality of surface regions, the surface regions are oriented in different directions and at least one of the markers is arranged in each of the surface regions. From the two-dimensional capture information items, which are obtained by the optical capture of the target body, an appearance of the marker or the marker arrangement that is distorted in relation to a capture of the marker or the marker arrangement in a first surface region, which would occur in the direction of the alignment of the first surface region, and/or an appearance of the marker or the marker arrangement, in a second surface region, that is distorted in relation to a capture of the marker or the marker arrangement in the second surface region, which would occur in the direction of the alignment of the second surface region, are determined and taken into account when determining the alignment of the target body.

In accordance with the third measure of the present disclosure, too, such a target body can be used and the alignment of a movable object connected to the target body can be determined. However, according to the third measure, a plurality of surface regions, at which at least one capture structure is arranged in each case, need not necessarily be connected to form a common body.

If the capture information items are two-dimensional information items, as is the case for digital camera images, for example, then it is possible to refer to a viewing direction, in particular the optical axis of the camera, which extends perpendicular to the two-dimensional area of the capture information items. Areal capture structures, in particular capture structures extending along a plane, whose alignment is not equal to the viewing direction can be considered to be rotated about an axis of rotation extending perpendicular to the viewing direction. A problem arising here is that the same distortion or deformation of the appearance arises if the capture structure is rotated from the viewing direction in one rotational direction or in the opposite rotational direction about the aforementioned axis of rotation. Which of two possible alignments the capture structure has is not ascertainable without additional information items. A single image or, formulated more generally, locally two-dimensional capture information items alone is/are insufficient in this respect. If the capture structure or an arrangement of capture structures is axially symmetric in respect of a mirror axis extending along the capture structure or arrangement, it is further not possible to uniquely determine from a single image all rotational states in respect of an axis of rotation extending in the viewing direction of the capturing device.

As part of the third measure, solutions are provided as to how the alignment of an arrangement of capture structures can be determined. The arrangement of capture structures includes a plurality of capture structures. At least one first and one second of the capture structures differ from one another. Both capture structures, and typically all capture structures, of the arrangement have a profile of an optical property that varies along a surface of the respective capture structure. The capture structures, or at least some of the capture structures, are captured by the capturing device and corresponding capture information items are obtained. The optical property is expressible by a corresponding numerical value in accordance with a specified mapping, at least at each location along a surface direction of the capture structure, and said optical property varies in such a way that the profile of the optical property that varies along the surface corresponds to a progression of numerical values on an ordered scale of the numerical values, which is interpretable as a first mathematical function of the location.

According to a first configuration, at least one first and one second of the capture structures are configured in such a way that the first mathematical functions of the capture structures differ from one another. This relates to the first mathematical functions, which mathematically describe the actual profile of the optical property of the respective capture structure if corresponding numerical values are assigned. Expressed differently, the actual profiles of the optical properties of the capture structures therefore differ from one another.

If then numerical values are obtained or assigned from the capture information items, which correspond in accordance with the specified mapping, there is determination of which of the capture structures is assigned to which part of the capture information items by carrying out frequency analyses of the captured progressions of numerical values of the captured capture structures, with prior knowledge about the profiles of the optical property of at least the first and the second capture structure being taken into account. Already from this identification of the capture structures, it is possible to determine the alignment of the arrangement of capture structures, and hence of the movable object.

Typically, the alignment is also determined therefrom. In particular, the alignment is determined in respect of at least one direction, e.g., a viewing direction or an optical axis of the capturing device, which extends transversely to the surfaces of the captured capture structures. On account of the unique identification of individual capture structures, it is possible, in particular to determine the rotary position and hence the alignment in respect of the aforementioned direction or axis of rotation.

According to a second configuration, the first and the second capture structure, and typically further capture structures, of the arrangement are configured in such a way that the first mathematical functions of the capture structures differ from one another in respect of at least one frequency of the progression of numerical values and hence of the mathematical function. This also relates to the first mathematical functions, which mathematically describe the actual profile of the optical property of the respective capture structure if corresponding numerical values are assigned. Expressed differently, the actual profiles of the optical properties of the capture structures therefore differ from one another.

By performing frequency analysis of the captured progressions of numerical values, frequencies of the captured progressions of numerical values are determined and the alignment of the movable object is determined from the determined frequencies, with prior knowledge about the frequencies of the mathematical functions being taken into account. Here, it is possible, in particular, to carry out a partial evaluation for each individual captured capture structure in respect of the frequency of the captured profile while taking account of the prior knowledge about the captured profile (typically with the result of the identification of the capture structure according the first configuration being taken into account) and/or it is possible to relate a plurality of the results for the determined frequencies to one another; by way of example, it is possible to form a frequency relationship between respectively two frequencies or a plurality of frequencies. Overall, this also allows determination of the alignment of the arrangement of capture structures, and hence of the movable object, in respect of at least one axis of rotation, which extends transversely to the viewing direction of the capturing device when capturing the individual capture structures. Since there can be various viewing directions, in particular if the capturing device includes a plurality of capturing units, the alignment can be carried out not only for one viewing direction in respect of two axes of rotation extending perpendicular to one another and perpendicular to the viewing direction; instead, it can also be carried out for a plurality of different viewing directions.

The rotary angle of the captured capture structure can be determined with a cosine function, particularly in respect of an axis of rotation which is perpendicular to the viewing direction of the capturing device and extends in the surface plane of a planar capture structure. By way of example, the profile of the optical property of the captured capture structure is periodic with a period length (the distance between two successive maxima or minima) which equals a reciprocal of the period frequency, with the period length extending perpendicular to the axis of rotation, i.e., the profile of the optical property is perpendicular to the axis of rotation. If the capture structures are captured when rotated about the aforementioned axis of rotation, the period length in the captured image or, expressed more generally, in the capture information items appears with a length equaling the cosine of the rotary angle multiplied by the actual period length. What therefore emerges for the frequency in the captured image is that it equals the reciprocal of the cosine of the rotary angle multiplied by the actual period length. What follows therefrom is that the frequency in the captured image equals the frequency of the profile of the optical property divided by the cosine of the rotary angle. If the frequency of the profile of the optical property is now known, it is possible to determine the rotary angle from the frequency in the captured image or, expressed more generally, in the capture information items.

What needs to be taken into account in any case is that the frequency is dependent on the angle of the viewing direction of the capturing device with respect to the surface normal of the capture structure and also dependent on an optical unit of the capturing device. By way of example, the frequency when using non-telecentric optics of the capturing device depends on the distance between the capture structure and the capturing device.

By way of a frequency analysis, which, as already described above, can be carried out quickly, for example by way of a Fourier transform such as, e.g., an FFT, it is possible to determine the frequency from the capture information items. However, in the case of non-telecentric imaging of the capture structure during the capture, the frequency appearing at the rotary angle of zero, and hence the frequency required for determining the rotary angle, depends on the distance between the capturing device and the capture structure. The distance or the required frequency can be determined at least by using additional information items, which may be available in full or in part as prior knowledge. By way of example, the effect of the non-telecentric imaging on the frequency can be determined in advance by calibration. If the captured capture structure then is uniquely identified, the prior knowledge about the frequency of the variation of the optical property can be used to determine the required frequency.

As mentioned previously, it is not possible to determine the alignment unambiguously by determining the rotary angle of a single capture structure. However, since the arrangement of capture structures includes a plurality of capture structures which are aligned in different directions, the direction in which the captured capture structure is twisted can be determined unambiguously by taking account of the prior knowledge about the configuration of the arrangement of capture structures. Here, certain configurations of more than two capture structures with different alignments simplify the unique determination of the alignment, wherein at least two of the capture structures may also be aligned in the same direction (i.e., their surface normals extend parallel to one another). By way of example, two of the capture structures can have different frequencies of the variation of the optical property, wherein each of the capture structures has a frequency that is only characteristic therefor. By way of example, the profiles of the optical property are respectively periodic in respect of one frequency only and differ in terms of these frequencies, particularly in the case of the two capture structures aligned in the same direction and typically in the case of all capture structures of the arrangement. The two capture structures aligned in the same way always have the same rotary angle in respect of an axis of rotation that extends parallel to a surface direction of the capture structures with the same alignment. On account of the different characteristic frequencies, the capture information items, with which both capture structures were captured, can be used to uniquely and quickly determine which of the two capture structures with the same alignment a captured capture structure is. By way of example, all that needs to be determined is which characteristic frequency of the captured capture structures is larger or smaller.

In one configuration, the arrangement of capture structures includes at least three capture structures. Here, the capture structures are arranged in such a way that the capture structures would not be captured as lying in succession along a straight line from any possible capture direction in the case of the simultaneous capture of the capture structures. These circumstances can be expressed differently by virtue of the fact that, in the case of capture structures each extending along a plane, said capture structures form an angled arrangement in each of the capture directions which allow a simultaneous capture of the capture structures.

In particular, each capture structure of the arrangement is formed on a planar surface region in each case. Here, two of the surface regions can adjoin one another and be interconnected in each case. Consequently, the arrangement bends at their transition. In particular, a chain of a plurality of successive surface regions with at least one capture structure in each case can be realized by such transitions, wherein the arrangement bends at each transition and hence the adjoining surface regions have different alignments. By way of example, five surface regions, each with a capture structure, are present in this case. In a specific configuration, three of the five surface regions can be aligned in the same direction, i.e., their surface normals are parallel to one another.

The capture structures can be arranged at the movable object or at an object that is not moved along with the movable object. This also includes the case where at least one of the capture structures is arranged at the movable object and at least one of the capture structures is arranged at an object that is not moved along. However, the alignment of the at least one first and at least one second of the capture structures relative to one another is known in any case and this information item can be used directly or indirectly for determining the alignment of the movable object. Typically, at least the first and the second capture structure are securely connected to one another, either directly or indirectly (for example via the movable object). The surfaces of at least the first and the second capture structure are oriented in different directions. This means that the surfaces of the different capture structures are oriented in inherently different directions. In particular, it is typical for all of the surfaces of at least the first and second capture structure to respectively extend along a plane, i.e., to be planar with the exception of surface roughness or irregularities in the surface. By way of example, such irregularities may also be caused by the production. By way of example, ink is applied to a surface by inkjet printing and an irregularity is generated in this way.

Capturing a capture structure in a viewing direction that does not coincide with the surface normal or extend parallel thereto leads to a distortion or deformation of the capture structure in the capture information items. Additional information items about the alignment are obtained by the capture of at least two capture structures that are aligned in different directions. Then, a decision can be made as to whether the various capture structures are rotated in one rotational direction or in the opposite rotational direction about an axis of rotation, which extends perpendicular to the capture direction. Naturally, the case may also arise where one of the surface regions is aligned in the capture direction. In this case, the distorted appearance of another capture structure of the arrangement supplies an additional information item about the alignment of the arrangement overall. In particular, this additional information item can be used to determine a rotary position of the arrangement and hence of the movable object with respect to a rotation about the capture direction.

Typically, at least one of the capture structures and, in particular, all of the capture structures each have the principal features described above in relation to the first measure. Therefore, the arrangement of the capture structures can be used not only in accordance with the third measure for the purposes of determining the alignment of the movable object but also in accordance with the first measure for the purposes of determining the position of the movable object. Since at least the surfaces of the first and the second capture structure are also oriented in different directions, the arrangement of capture structures can also be captured from different viewing directions and the position can already be determined using the capture information items respectively captured from one of the viewing directions.

In particular, the third measure can be defined by the following exemplary embodiments:

Exemplary embodiment 1: An arrangement comprising a plurality of capture structures which can be captured together for determining an alignment of a movable object of an arrangement of objects, in particular of a component of an arrangement of components such as, e.g., a machine, wherein:

the capture structures are arranged at the movable object or at an object that is not moved along with the movable object, wherein surfaces of at least two of the capture structures are oriented in different directions, the arrangement includes a capturing device for capturing the capture structures, the capturing device is configured to optically capture the capture structure and thereby obtain capture information items, wherein different parts of the capture information items are assigned to different capture structures, the capture structures each have a profile of an optical property that varies along a surface of the capture structure, the optical property is expressible by a corresponding numerical value in accordance with a specified mapping, at least at each location along a surface direction of the capture structure, and said optical property is varied in such a way that the profile of the optical property that varies along the surface corresponds to a progression of numerical values on an ordered scale of the numerical values, which is interpretable as a first mathematical function of the location, at least one first and one second of the capture structures are configured in such a way that the first mathematical functions of the capture structures differ from one another, the arrangement includes an evaluation device, wherein the evaluation device or the capturing device is configured to assign to the optical property captured by the capture information items the corresponding numerical values as per the specified assignment, and so a captured progression of numerical values is obtained for each captured capture structure, and the evaluation device is configured to determine which of the first and second capture structures are assigned to what part of the capture information items by performing frequency analyses of the captured progressions of numerical values, with prior knowledge about the profiles of the optical property of the first and the second capture structure being taken into account.

Exemplary embodiment 2: An arrangement comprising a plurality of capture structures which can be captured together for determining an alignment of a movable object of an arrangement of objects, in particular of a component of an arrangement of components such as, e.g., a machine, wherein:

the capture structures are arranged at the movable object or at an object that is not moved along with the movable object, wherein surfaces of the at least two of the capture structures are oriented in different directions, the arrangement includes a capturing device for capturing the capture structures, the capturing device is configured to optically capture the capture structure and thereby obtain capture information items, wherein different parts of the capture information items are assigned to different capture structures, the capture structures each have a profile of an optical property that varies along a surface of the capture structure, the optical property is expressible by a corresponding numerical value in accordance with a specified mapping, at least at each location along a surface direction of the capture structure, and said optical property is varied in such a way that the profile of the optical property that varies along the surface corresponds to a progression of numerical values with a plurality of local maxima and a plurality of local minima on an ordered scale of the numerical values, which is interpretable as a first mathematical function of the location, at least a first and a second capture structure are configured in such a way that the first mathematical functions of the capture structures differ from one another in respect of at least one frequency of the progression of numerical values and hence of the mathematical functions, the arrangement includes an evaluation device, wherein the evaluation device or the capturing device is configured to assign to the optical property captured by the capture information items the corresponding numerical values as per the specified assignment, and so a captured progression of numerical values is obtained for each captured capture structure, and the evaluation device is configured to determine frequencies of the captured progressions of numerical values by performing frequency analysis of the captured progressions of numerical values and to determine the alignment of the movable object from the determined frequencies, with prior knowledge about the frequencies of the mathematical functions being taken into account.

Exemplary embodiment 3: The arrangement according to exemplary embodiment 1 or 2, wherein the profile of the optical property, which varies along the surface of the capture structure, respectively has a characteristic frequency for the capture structure in the case of at least two of the capture structures, which characteristic frequency occurs in none of the other capture structures of the arrangement.

Exemplary embodiment 4: A method for determining an alignment of a movable object of an arrangement of objects, in particular of a component of an arrangement of components such as, e.g., a machine, wherein:

a plurality of capture structures are arranged at the movable object or at an object that is not moved along with the movable object, wherein surfaces of at least two of the capture structures are oriented in different directions, a capturing device optically captures the capture structures and thereby obtains capture information items, wherein different parts of the capture information items are assigned to different capture structures, the capture structures each have a profile of an optical property that varies along a surface of the capture structure, the optical property is expressible by a corresponding numerical value in accordance with a specified mapping, at least at each location along a surface direction of the capture structure, and said optical property is varied in such a way that the profile of the optical property that varies along the surface corresponds to a progression of numerical values on an ordered scale of the numerical values, which is interpretable as a first mathematical function of the location, at least one first and one second of the capture structures are configured in such a way that the first mathematical functions of the capture structures differ from one another, an evaluation device or the capturing device assigns to the optical property captured by the capture information items the corresponding numerical values as per the specified assignment, and so a captured progression of numerical values is obtained for each captured capture structure, and the evaluation device determines which of the first and second capture structures are assigned to what part of the capture information items by performing frequency analyses of the captured progressions of numerical values, with prior knowledge about the profiles of the optical property of the first and the second capture structure being taken into account.

Exemplary embodiment 5: A method for determining the alignment of a movable object of an arrangement of objects, in particular of a component of an arrangement of components such as, e.g., a machine, wherein:

a plurality of capture structures are arranged at the movable object or at an object that is not moved along with the movable object, wherein surfaces of at least two of the capture structures are oriented in different directions, a capturing device optically captures the capture structures and thereby obtains capture information items, wherein different parts of the capture information items are assigned to different capture structures, the capture structures each have a profile of an optical property that varies along a surface of the capture structure, the optical property is expressible by a corresponding numerical value in accordance with a specified mapping, at least at each location along a surface direction of the capture structure, and said optical property is varied in such a way that the profile of the optical property that varies along the surface corresponds to a progression of numerical values with a plurality of local maxima and a plurality of local minima on an ordered scale of the numerical values, which is interpretable as a first mathematical function of the location, at least a first and a second capture structure are configured in such a way that the first mathematical functions of the capture structures differ from one another in respect of at least one frequency of the progression of numerical values and hence of the mathematical functions, an evaluation device or the capturing device assigns to the optical property captured by the capture information items the corresponding numerical values as per the specified assignment, and so a captured progression of numerical values is obtained for each captured capture structure, and the evaluation device determines frequencies of the captured progressions of numerical values by performing frequency analysis of the captured progressions of numerical values and to determine the alignment of the movable object from the determined frequencies, with prior knowledge about the frequencies of the mathematical functions being taken into account.

Exemplary embodiment 6: An arrangement comprising a plurality of capture structures which can be captured together for determining an alignment of a movable object of an arrangement of objects, in particular of a component of an arrangement of components such as, e.g., a machine, wherein:

at least two of the capture structures are oriented in different directions, the capture structures each have a profile of an optical property that varies along a surface of the capture structure, the optical property is expressible by a corresponding numerical value in accordance with a specified mapping, at least at each location along a surface direction of the capture structure, and said optical property is varied in such a way that the profile of the optical property that varies along the surface corresponds to a progression of numerical values on an ordered scale of the numerical values, which is interpretable as a first mathematical function of the location, and at least one first and one second of the capture structures are configured in such a way that the first mathematical functions of the capture structures differ from one another.

Exemplary embodiment 7: The arrangement according to exemplary embodiment 6, wherein the profile of the optical property, which varies along the surface, corresponds to a progression of numerical values with a plurality of local maxima and a plurality of local minima on the ordered scale of the numerical values.

Exemplary embodiment 8: The arrangement according to exemplary embodiment 6 or 7, wherein at least the first and the second capture structure are configured in such a way that the first mathematical functions of the capture structures differ from one another in respect of at least one frequency of the progression of numerical values and hence of the mathematical functions.

BRIEF DESCRIPTION OF THE DRAWINGS

The disclosure will now be described with reference to the drawings wherein.

DESCRIPTION OF EXEMPLARY EMBODIMENTS

Figure 1:
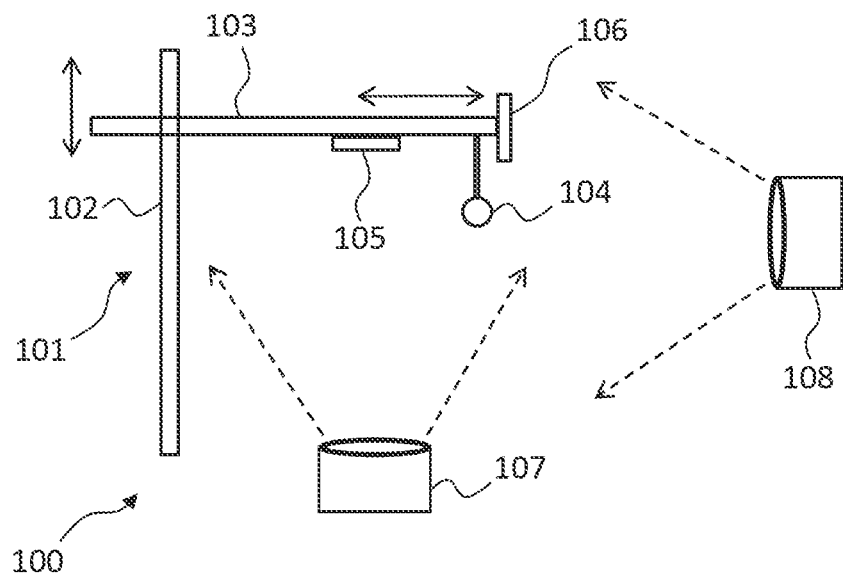
FIG. 1 schematically shows an arrangement with a movable part and a plurality of capturing units for capturing the movable part, FIG. 2 schematically shows an arrangement for determining a position and/or alignment of a movable object of an arrangement of objects.

FIG. 1 shows an arrangement 100 which includes an object arrangement 101 with a stationary part 102 and a movable part 103, and two capturing units 107, 108 for capturing the movable part 103. In particular, the object arrangement 101 is a machine, such as a machine tool or coordinate measuring machine, for example. Further, the object arrangement 101 might be, for example, a treatment apparatus for treating a patient. Therefore, the capturing units can be securely connected to a base plate or base of the machine, for example. The schematically illustrated object arrangement 101 includes a stationary part 102, which extends upward in elongate fashion, for example proceeding from a base not illustrated here. The movable part 103 is arranged at the stationary part 102 so as to be movable in the vertical direction. Consequently, the movable part 103 can be moved upward and downward along the stationary part 102. Further, the movable part 103 is also movable relative to the stationary part 102 in the horizontal direction. In specific embodiments, the movable part 103 can be connected to the stationary part 102 by way of further parts, which are not illustrated in FIG. 1. By way of example, a first connecting part can be directly arranged in movable fashion at the stationary part 102 and the movable part 103 can be arranged in movable fashion at this part. Further, it is alternatively or additionally possible for the sensor 104, which is illustrated bottom right at the movable part 103 in FIG. 1, to be able to be moved relative to the movable part 103, to be precise in, e.g., the vertical direction. Further alternatively or additionally, it is possible for the stationary part 102 to be replaced by a movable part which, for example, is movable relative to the aforementioned base in the horizontal direction. Further alternatively or additionally, the aforementioned linear mobility can be replaced and/or complemented by rotary mobility.

The schematic illustration in FIG. 1 only serves to elucidate the principle of capturing a movable part with a plurality of capturing units. Therefore, the further component arranged at the movable part 103 of FIG. 1 need not be a sensor 104, which is, e.g., a tactile sensing or optical sensor of a coordinate measuring machine or, alternatively, a processing tool of a machine tool in the exemplary embodiment, but can be, for example, a treatment device such as an irradiation device for treating a patient.

Two capturing units 107, 108 are provided in the schematic illustration of FIG. 1, wherein the first capturing unit 107 has a capture region which is located above the capturing unit 107 in the exemplary embodiment. A marker 105, which is securely connected to the movable part 103, is located within this capture region. Here, the surface of the marker 105 extends transversely to the capture directions, within which the capturing unit 107 can capture objects within its capture region and also captures said objects during its operation. At least one capture structure, which is captured during the operation of the capturing unit 107, is located at the surface of the marker 105 that is aligned downward toward the capturing unit 107.

The second capturing unit 108 is aligned in such a way that its capture region extends to the left thereof in the illustration of FIG. 1. A second marker 106, which is securely connected to the movable part 103, is located within the capture region. The surface of the marker 106 aligned to the right in the illustration of FIG. 1 has at least one capture structure which is captured during the operation of the second capturing unit 108.

In the schematically illustrated exemplary embodiment of FIG. 1, the movable part 103 is movable in the vertical and horizontal direction, as mentioned previously. Here, the capture regions of the capturing units 107, 108 are aligned and positioned and also dimensioned in such a way that the surface of the first marker 105, which faces the first capturing unit 107, is located within the capture region of the capturing unit 107 with the at least one capture structure in every possible movement position of the movable part 103. A corresponding statement applies to the second marker 106 and the second capturing unit 108 in respect of the vertical movement direction of the movable part 103. In each movement position of the movable part 103, the second capturing unit 108 captures the surface of the second marker 106 facing it and hence the at least one capture structure formed thereon.

If, as mentioned, an arrangement has further degrees of freedom and/or other degrees of freedom of movement, then a corresponding statement as described above typically also applies to such an arrangement. By way of example, in addition to the components of the arrangement illustrated in FIG. 1, provision can be made of a further capturing unit and a further marker, which facilitate the capture of the position of the movable part in respect of a movement direction that extends perpendicular to the plane of the drawing. In the case of at least one rotational degree of freedom of movement, typically at least one capturing unit can, at least within a range of rotational positions, capture a marker or a plurality of markers, each with at least one capture structure, in each rotational position of the movable part. If the possible range of rotational positions is large, it may be necessary to use more than one capturing unit for the capture of the at least one marker since the at least one capture structure of the marker is not able to be captured by the same capturing unit or, in any case, is not able to be captured with a sufficient spatial resolution in each rotational position. Even in the case of a linear degree of freedom of movement, it may be the case that a single capturing unit cannot capture the at least one capture structure in all portions of the movement range and hence at least one further capturing unit becomes necessary. Typically, the positions and alignments of all capturing units are known in a common coordinate system.

Figure 2:
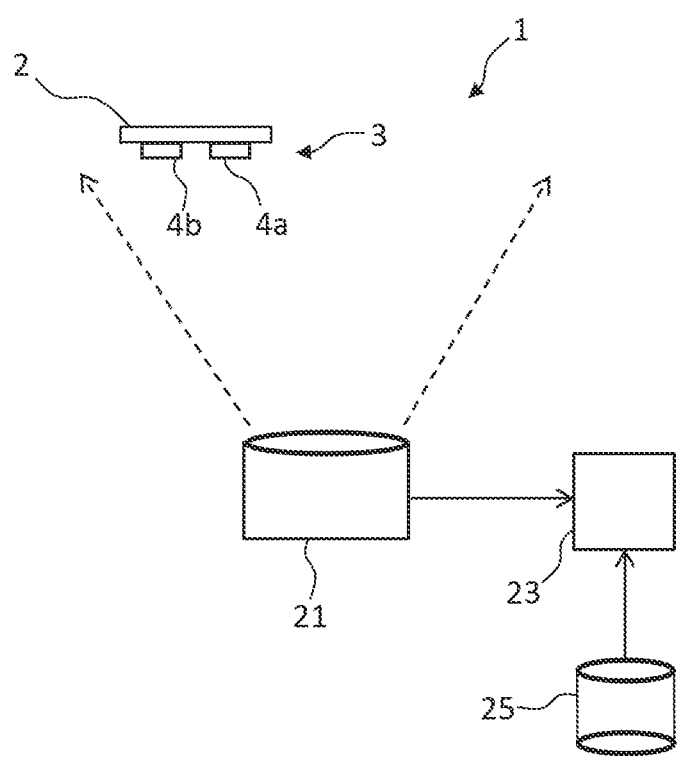

FIG. 2 shows an arrangement 1 with a marker 2, at the downwardly pointing surface of which a plurality of capture structures 4a, 4b are arranged. The capture structures 4a, 4b are part of an arrangement 3 of capture structures, wherein this arrangement 3 can have further capture structures, not illustrated in FIG. 2, which can be present at a different location and with a different alignment to the capture structures 4a, 4b. Nor is it necessary in alternative configurations for a plurality of capture structures to be part of the same marker. Further alternatively or additionally, it is possible for only one capture structure and/or for more than two capture structures to be arranged or embodied at the same surface of the marker, in particular at a surface of a marker extending along a plane.

However, the position and the alignment of each capture structure is typically known in a common coordinate system for an arrangement of capture structures. This prior knowledge can then be used for determining the position and/or alignment of a movable object after capturing at least some of the capture structures.

In addition to the marker 2, the arrangement 1 illustrated in FIG. 2 has a suitably arranged capturing unit 21 configured for capturing the capture structures 4a, 4b of the marker 2, which capturing unit can be, e.g., one of the capturing units 107, 108 of FIG. 1. Accordingly, the marker 2 can be, e.g., the marker 105 or 106 of FIG. 1.

During its operation, the capturing device 21 captures capture information of all objects in its capture region. Also included therein in any case for a plurality of relative positions of marker 2 and capturing unit 21 is the plurality of capture structures 4a, 4b at the surface of the marker 2 that faces the capturing unit 21. In particular, the capturing unit 21 generates a one-dimensional or two-dimensional image of the capture structures 4a, 4b in its surroundings. Depending on the relative position and relative orientation of marker 2 and capturing unit 21, the images of the capture structures 4a, 4b are located at different positions in the image recorded by the capturing unit 21. It is thus possible, in principle, from the position of the image of at least one of the capture structures 4a, 4b in the recorded image, to determine the position and/or alignment of marker 2 and capturing unit 21 and thus of the objects respectively connected thereto. However, according to an aspect of the disclosure, the position of the image or images of the capture structure(s) in the recorded image is not, or not only, determined by conventional image processing; instead, a frequency analysis is performed.

The capturing unit 21 and optionally at least one further capturing unit, not illustrated in FIG. 2, is connected to an evaluation device 23 for performing the frequency analysis and for determining the position and/or alignment. Furthermore, FIG. 2 shows a data memory 25, from which the evaluation device 23 can obtain data, e.g., information items containing prior knowledge, in particular prior knowledge about the arrangement 3 of capture structures and/or about the configuration of at least one capture structure and typically of all capture structures of the arrangement. In particular, it also contains prior knowledge about the profile of the optical property along in each case at least one surface direction of the respective capture structure. Optionally, at least one of the capture structures can have a unique identification feature and the prior knowledge about this is also stored in the data memory 25 and can be made available for the evaluation device 23 (e.g., read by the latter from the data memory 25).

Figure 3:
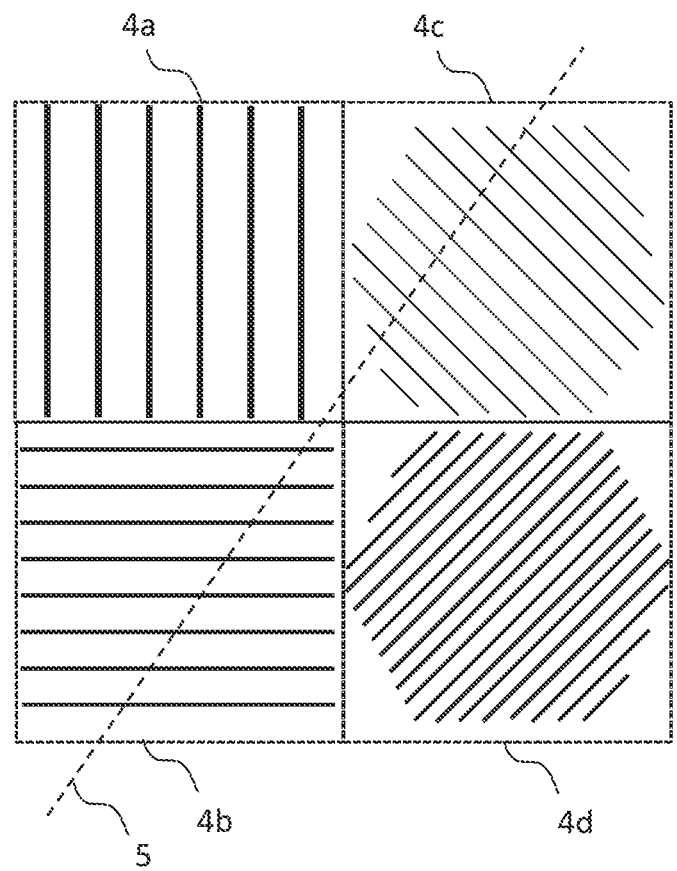
FIG. 3 shows a plan view of an arrangement with four capture structures, which extend along a common surface plane.

FIG. 3 shows four capture structures 4a, 4b, 4c, and 4d, which extend along a common surface plane of an object or a marker. By way of example, the capture structures 4a, 4b can be the capture structures from FIG. 2 with the same label.

Each of the four capture structures 4 illustrated in FIG. 3 is represented by a pattern of parallel lines. However, this representation should be understood to be schematic. In the case of a corresponding specific embodiment, each of the four capture structures 4 has a greyscale value profile, which is constant in the direction of the lines or respectively has a single maximum or minimum in the line center and which has a continuously periodic greyscale value profile in each direction perpendicular to the course of the lines, said periodic greyscale value profile being superposed by a statistical distribution function with a single maximum or a single minimum. The relative position of the lines therefore indicates, for example, the relative position of the local maxima of the greyscale value profile, wherein, in accordance with the periodic profile between two local maxima, there is in each case a local minimum precisely in the center between the local maxima. The terms maximum and minimum should be understood in relation to the greyscale value. In particular, the greyscale values can be denoted by numerical values, wherein, in particular, the greatest numerical value on the scale corresponds to the darkest or the brightest level of grey and the smallest numerical value accordingly corresponds to the brightest or the darkest level of grey.

The frequencies of the periodic profiles of the four capture structures 4 in FIG. 3 are different from one another. The first capture structure 4a, top left in FIG. 3, has the lowest frequency and hence the longest period length. The second capture structure 4b, bottom left in FIG. 3, has the next lowest frequency. The third capture structure 4c, top right in FIG. 3, has the second highest frequency, which is higher than the second lowest frequency. The fourth capture structure 4d, bottom right in FIG. 3, has the highest frequency.

Moreover, the directions of the illustrated lines, and hence also the surface directions perpendicular thereto along which the period length is greatest, are different in all four capture structures 4. The direction of the greatest period length extends in the horizontal direction of FIG. 3 in the case of the first capture structure 4a, in the vertical direction of FIG. 3 in the case of the second capture structure 4b, from bottom left to top right in the case of the third capture structure 4c and from top left to bottom right in the case of the fourth capture structure 4d.

Therefore, if the profile of the optical property is captured by a capturing device along any surface direction which extends along two or three of the four capture structures 4, it is already possible to determine the approximate alignment of the arrangement of capture structures 4 relative to the capturing unit or capturing device when the prior knowledge about the different frequencies and different alignments of the four capture structures 4 is taken into account. If a plurality of image lines or image columns are evaluated, as in the case of a two-dimensional camera image of a digital camera, it is possible to determine the alignment very accurately. An example for a single surface direction, along which the arrangement of capture structures 4 is captured by, for example, a digital camera line, is illustrated in FIG. 3 by a dashed line having the reference sign 5.

Figure 4:
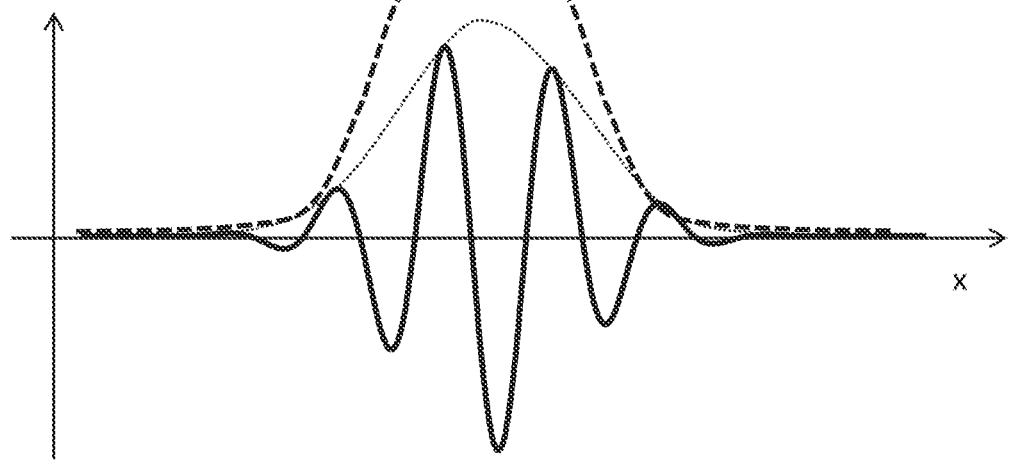
FIG. 4 shows mathematical functions corresponding to the profile of an optical property of a capture structure along a surface direction of the capture structure, FIG. 5 schematically shows a capturing unit and an evaluation device, wherein the evaluation device includes a plurality of data processors.

FIG. 4 shows, with an uninterrupted line, a first mathematical function corresponding to the profile of the optical property of a capture structure, which varies along a surface direction of the capture structure. By way of example, the optical property of the first capture structure 4a, top left in FIG. 3, can extend in the horizontal image direction, as illustrated in FIG. 4. The spatial coordinate x extends along the horizontal axis of the diagram illustrated in FIG. 4; the scale of numerical values which are assignable to the optical property extend along the vertical axis.

By way of example, the mathematical function is obtained by multiplying a sine function with a Gaussian distribution function, which is illustrated using dashed line. Five local minima and four local maxima of the function are easily identifiable in FIG. 4. Further local minima and local maxima are present. However, on account of the weighting of the sine function by the normal distribution function, these are weighted to be so small that they are hardly identifiable at the chosen scaling of the vertical axis. The most pronounced local minimum is located near the maximum of the normal distribution function. From the unequal height of the most pronounced local maxima, it is possible to identify that the maximum of the normal distribution function does not coincide exactly with a minimum of the sine function. If these were to coincide, then the resultant mathematical function would have an axis of symmetry parallel to the vertical diagram axis.

Moreover, a Gaussian distribution is illustrated by a dashed line in FIG. 4. The point at which the normal distribution has a maximum coincides with the maximum of the second mathematical function, which has the local maxima of the first mathematical function as function values. Further, there exists a third mathematical function, the function values of which are the local minima of the first mathematical function; it likewise has an extremum at the point of the maximum of the Gaussian distribution function, with this extremum being a minimum. The second mathematical function is represented by a dotted line.

First mathematical functions of the type illustrated in FIG. 4 are well suited for determining the position and/or alignment with a frequency analysis and consequently for determining the position of the capture structure in respect of the x-axis. Individual examples of the type can differ in respect of the frequency of the sine function or cosine function, which is weighted by the normal distribution function. By way of example, the four capture structures 4 schematically illustrated in FIG. 3 are realized by functions with different frequencies, of the type illustrated in FIG. 4. Then, there is also a difference in the surface directions of the individual capture structures, along which the period length of the profile of the optical property is longest.

As described above, the mathematical function illustrated in FIG. 4 is not symmetric with respect to a straight line extending parallel to the vertical axis. However, the profile of the optical property along a surface direction and typically along almost all surface directions, with the exception of the surface direction that extends perpendicular to the surface direction with the longest period length of the optical property, is typically configured in such a way that the profile is symmetric with respect to a location. The symmetry means that, at the same distance from the location of symmetry, the optical property has the same magnitude in the opposite direction along the surface direction. Further, it is typical that there is only one such location of symmetry for the profile of the optical property. In particular, this is the location of the absolute maximum or absolute minimum in the case of the above-described function type, in which a sine function or a cosine function is multiplied by a symmetric statistical distribution function, wherein the statistical distribution function has a single maximum or minimum and is symmetric with respect to the location of the maximum or minimum. Above, a Gaussian function was specified as an example of such a statistical distribution function. The typical feature, according to which there is only a single location of symmetry, typically applies independently of the length over which the respective capture structure extends in the surface direction in which the location of symmetry is present. Therefore, a sine function or a cosine function has a plurality of locations of symmetry, specifically at each maximum or minimum. By contrast, a sine function or a cosine function which was multiplied by the aforementioned type of statistical distribution functions only has a single location of symmetry, specifically where the maximum or minimum of the statistical distribution function coincides with a maximum or minimum of the sine function or cosine function. However, in addition to a sine function or a cosine function, any other periodic function without discontinuities comes into question.

As is substantiated below, it is possible to determine the position for a symmetrical profile of the optical property in a simple manner. It is assumed here that the case of a mathematical function describing the profile of the optical property along a location axis involves a function having real function values. This corresponds to the real values which are obtained from capturing the local profile of the optical property. For real functions which are symmetrical with respect to the zero point of the location axis, it can be shown that the Fourier transform $X(\omega)$ is likewise a real function which is symmetrical with respect to the zero point of the frequency $\omega$:

$$X(\omega)=X(-\omega)=\overline{X(\omega)} \qquad \text{(Equation 1)}$$

In this case, the bar denotes complex conjugation, i.e., the sign of the imaginary part is reversed. For each frequency $\omega$, therefore, the absolute value of the Fourier transform is equal to the value of the Fourier transform and the phase is $\arg(X(\omega))=0$. However, if the optical property as a function of the location is not symmetrical with respect to the zero point, but rather with respect to some other location a along the surface direction considered, then the following holds true:

$$\mathcal{F}\{x(t-a)\}=X(\omega)\cdot e^{-j\omega a}=:\tilde{X}(\omega), \qquad \text{(Equation 2)}$$

where F is the operator of the Fourier transform, x is the function in the spatial domain, t is the location variable in the spatial domain, i.e., along the surface direction considered, e is the Euler number, and j is the imaginary unit, where $j^2=-1$. In accordance with Equation 2, the displacement of the point of symmetry or center of symmetry along the location axis has the effect that the Fourier transform of the location function is a complex function. It results from the Fourier transform of the location function that is symmetrical with respect to the zero point by multiplication by $e-j\omega a$. It follows directly from this that the phase of the complex Fourier transform is:

$$\arg(\tilde{X}(\omega))=-\omega a \qquad \text{(Equation 3)}$$

It follows in turn from this that $$\frac{\partial}{\partial \omega}\arg(\tilde{X}(\omega))=-a \qquad \text{(Equation 4)}$$

i.e., the first derivative of the phase with respect to the frequency is equal to the negative of the displacement of the point of symmetry along the location axis from the zero point.

Figure 5:
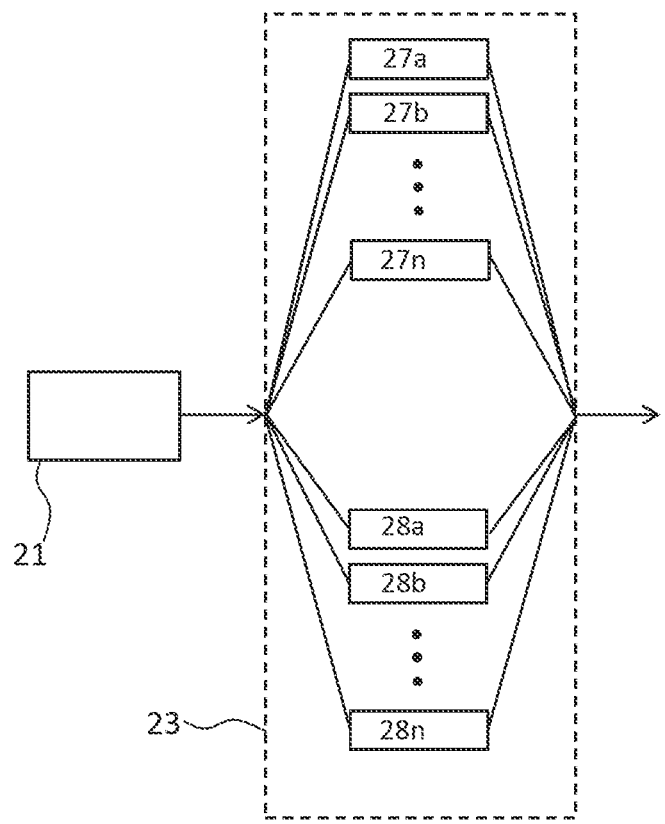

FIG. 5 shows a capturing unit 21, which might be the capturing unit shown in FIG. 2, for example. Further, an evaluation device 23 is shown in FIG. 5, said evaluation device possibly being the evaluation device of FIG. 2. During the operation of the arrangement, the capturing unit 21 transfers capture information items to the evaluation unit 23, which includes a plurality of the data processors 27a, 27b, . . . 27n and 28a, 28b, . . . 28n. Each of the data processors 27, 28 receives a subset of the capture information items and processes the latter. In particular, each of the data processors 27, 28 determines a partial result of the evaluation of the overall capture information items. By way of example, the partial result respectively is the position of the capture structure in an image generated by the capturing unit 21, as obtained from the subset processed by the data processor. By way of example, if the markers in FIG. 3 are considered, a position is obtained, for almost all lines and almost all columns, for each of the four captured capture structures. Only for the image lines and image columns which extend along the lines illustrated in FIG. 3 is no position determined by the method according to the disclosure.

In particular, it is possible to transfer from the capturing unit to the evaluation device 23 a two-dimensional image which captures the capture structure or a plurality of capture structures in their respective surroundings, said transfer being carried out repeatedly. The data of an image line are respectively transferred to the data processors 27a, 27b, . . . 27n, wherein the number of data processors 27 equals the number of image lines present. Further, the data of an image column are respectively supplied to the data processors 28a, 28b, . . . 28n, with the number of data processors 28 equaling the number of image columns. Two-dimensional images can be evaluated very quickly in this way. By way of example, each of the data processors 27, 28 carries out a digital Fourier transform and optionally moreover performs a frequency analysis of the image line or image column.

In another configuration, there are fewer data processors 27 than image lines and fewer data processors 28 than image columns; instead, there is an integer fraction thereof present, such as half or a third. In this case, the evaluation device typically includes a data buffer, in which the capture information items received by the capturing unit are typically stored image-by-image. Each of the data processors 27 receives an image line from the data buffering and evaluates said image line. Once the evaluation has been completed, each of the data processors 27 receives a further image line. As a result, each of the data processors 27 can evaluate a plurality of image lines. The results of the evaluation are typically stored on the output side of the data processors 27 in a data memory. The data processors 28 each evaluate a plurality of image columns in corresponding fashion.

Figure 6:
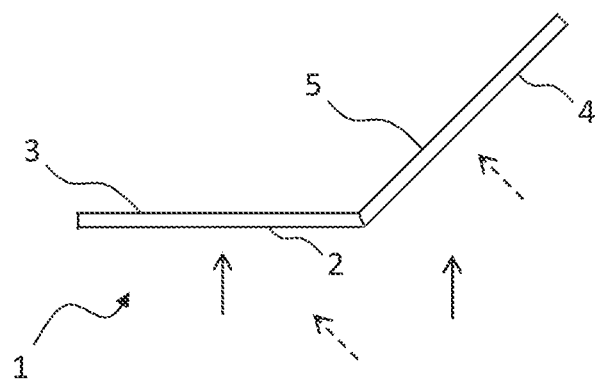
FIG. 6 shows two capture structures, which each extend along a planar surface region, wherein the surface regions are oriented in different directions.

FIG. 6 shows an arrangement 1 with a plurality of capture structures, which are formed at surface regions 2, 4 of plate-shaped portions 3, 5 of a marker. In the specifically illustrated exemplary embodiment, the angle between the plate-shaped portions is 45°, and so the surface profile is angled accordingly. The surface bends at the transition from the first surface region 2 to the second surface region 4. The capture structures themselves are not identifiable in FIG. 6.

A first capture direction is indicated in FIG. 6 by way of two arrows with solid lines, a capturing device capturing the capture structures in said capture direction. If the object, at which the arrangement 1 is arranged, rotates through 45° in a clockwise direction about an axis of rotation, extending perpendicular to the plane of the drawing of FIG. 6, at the transition of the surface regions 2, 4, then the capturing device captures the capture structures in the capture direction indicated by two arrows with dashed lines in FIG. 6.

Different images of the arrangement with the two capture structures arise when capturing in the different capture directions. In the capture direction, which is indicated by two arrows with solid lines, the capture structure formed at the first surface region 2 does not appear distorted. In the other capture direction, which is indicated by two arrows with dashed lines, the capture structure at the second surface region 4 does not appear distorted. The respective other capture structure appears distorted on account of the capture direction that is inclined in relation to the surface normal.

It is typical for the capture structures to be uniquely identifiable from the capture information items obtained. Therefore, the respective capture structure is identified when evaluating the capture information items, and so it is possible to ascertain, in particular, which of the surface regions 2, 4 is located, e.g., to the left or right in an overall image of the capture structures. In this way, it is possible in any case to capture the rotary position of the arrangement 1 in respect of an axis of rotation extending from the bottom to the top in FIG. 6, and hence it is also possible to capture the alignment.

In respect of the aforementioned axis of rotation, which extends in the perpendicular direction to the plane of the drawing of FIG. 6 at the transition of the surface regions 2, 4, the rotary position can be determined from the overall image of the arrangement 1 and its surroundings by virtue of taking account of prior knowledge about the profile of the optical property of the capture structures along the surface regions 2, 4. If both profiles are periodic in the direction extending from left to right in FIG. 6 and therefore if a corresponding frequency is pronounced in the frequency spectrum, then it is possible to evaluate the relative position of this pronounced frequency. Therefore, it is generally advantageous to perform a frequency analysis. On account of the first measure described in this description, it is consequently possible to determine the position of the movable object. The alignment can be determined on account of the third measure. By way of example, if the periodic profiles at the surface regions 2, 4 are each periodic with the same frequency, although this is not preferred, then the frequency of the capture structure arranged at the second surface region 4 would be increased in accordance with the 45° inclination with respect to the capture direction in the capture information items, which is gained by capture in the capture direction indicated by two arrows with solid lines in FIG. 6. The period length in the profile from bottom left to top right in FIG. 6 along the second surface region 4 would be shortened in the recorded overall image by a factor of 0.5 multiplied by the square root of 2, and the frequency would be increased accordingly.

Typically, there is not only one capture structure but an arrangement with a plurality of capture structures, for example as illustrated in FIG. 3, at each of the surface regions 2, 4 of the arrangement 1 in FIG. 6. This ensures that, for various rotary positions of the arrangement about an axis of rotation extending in the plane of the drawing of FIG. 6, the frequencies of the capture structures can be evaluated, and the alignment can be determined therefrom, in each case also in respect of an additional axis of rotation, which extends perpendicular to the plane of the drawing of FIG. 6.

Figure 7:
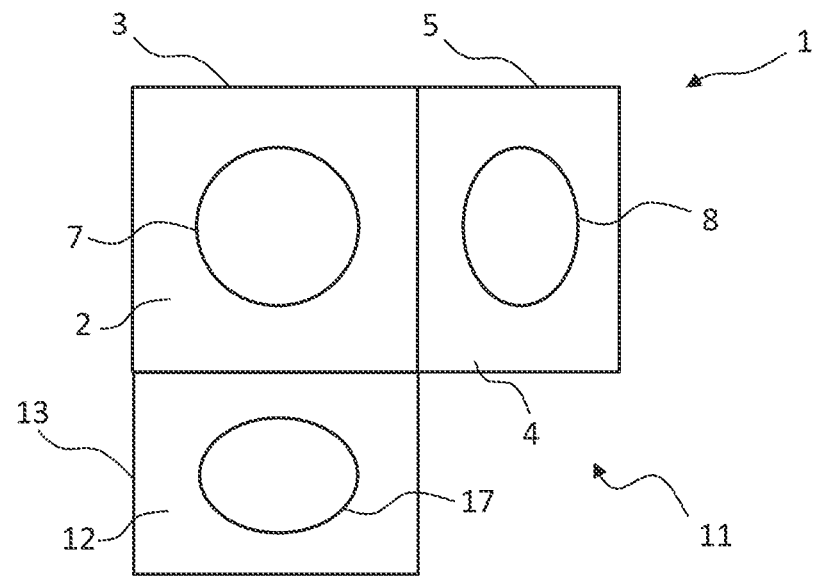
FIG. 7 shows a plan view of an arrangement with three surface regions.

FIG. 7 shows an arrangement 11 with three plate-shaped portions 3, 5, and 13. Here, the first surface region 2 of the first portion 3 in FIG. 7 is considered in a direction that extends perpendicular to the first surface region 2. Therefore, a circle illustrated in the first surface region 2, said circle only serving to elucidate the distortion and not being part of the capture structure, is also a circle and not an ellipse, as is identifiable in the second surface region 4 and the third surface region 12 of the third portion 13. The circular form on the first surface region 2 is denoted by the reference sign 7, the ellipse on the second surface region 4 is denoted by the reference sign 8 and the ellipse on the third surface region 12 is denoted by the reference sign 17. If the surface regions 4, 12 were each viewed from a direction extending perpendicular to the surface, the respective capture structure, not illustrated in FIG. 7, would be undistorted, corresponding to a circular form instead of an elliptic form.

In particular, the portions 3, 5 can be configured as described above on the basis of FIG. 6. With the exception of the fact that, in the case of the view from above in FIG. 7, the back side of the third surface region 12, i.e., the third portion 13, would be identifiable in the background, there are no differences to the illustration of FIG. 6. However, FIG. 7 elucidates the concept according to which plate-shaped portions that are angled with respect to one another can be arranged not only next to one another in one direction but also in two directions extending perpendicular to one another. If at least one capture structure and, typically, a plurality of differently aligned capture structures (as illustrated in FIG. 3, for example) are formed at each of the three surface regions 2, 4, 12, then the alignment can be determined, in particular also in respect of two axes of rotation extending in the plane of the drawing of FIG. 7, in accordance with the manner already described on the basis of FIG. 6, wherein the axis of rotation extends, for example, at the transition from the first portion 3 to the second portion 5 and the other axis of rotation extends at the transition from the first portion 3 to the third portion 13.

Figure 8:
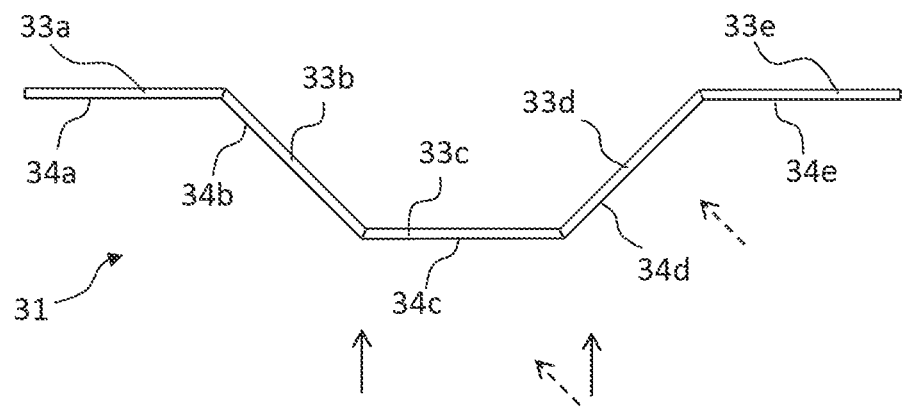
FIG. 8 shows an arrangement with five planar surface regions, at least one capture structure being formed at each thereof.

FIG. 8 shows that the principle of using a plurality of plate-shaped portions, each with at least one capture structure at the surfaces of the portions, which has already been explained on the basis of FIG. 6 can be implemented in a different way to what is illustrated in FIG. 7. Of the total of five plate-shaped portions 33a to 33e illustrated in FIG. 8, the third plate-shaped portion 33c and the fourth plate-shaped portion 33d correspond to the first plate-shaped portion 3 and second plate-shaped portion 5 in FIG. 6. The same pairs of arrows as in FIG. 6 are also illustrated in FIG. 8. In accordance with FIG. 6, these pairs of arrows indicate two possible capture directions. However, a peculiarity of the arrangement 31 in relation to the arrangement in FIG. 6 is immediately identifiable if the capture direction indicated by the two arrows with dashed lines is considered: The surface of the second plate-shaped material region 33b with the second surface region 34b, pointing down and to the left, is not captured in this capture direction. From this, it is also already possible to draw conclusions about the alignment of the arrangement 31, for example if an overall image of the arrangement 31 is recorded by the capturing device. The other surface regions, 34a of the first portion 33a, 34c of the third portion 33c, 34d of the fourth portion 33d and 34e of the fifth portion 33e, are however capturable from the two capture directions indicated in FIG. 8.

The arrangement 31 illustrated in FIG. 8 has a further advantage, which was already considered briefly above: The surface normals of three of the surface regions 34a, 34c, and 34e extend parallel to one another. If this prior knowledge is taken into account when evaluating the capture information items, it is possible to determine the rotary position of the arrangement 31, in respect of an axis of rotation extending from top to bottom in the plane of the drawing of FIG. 8, unambiguously and with great accuracy. A precondition here is that the capture structures at the first surface region 34a and the fifth surface region 34e can be unambiguously distinguished from one another. In particular, it is therefore typical, even in the arrangement 31 as per FIG. 8, for at least one of the capture structures to be uniquely identifiable in each surface region (only one may be present).

Naturally, it is generally also possible that it is not one capture structure that is uniquely identifiable but that the overall arrangement of the capture structures is uniquely identifiable at the respective surface or in the respective surface region. By way of example, precisely the arrangement with four capture structures, as illustrated schematically in FIG. 3, could in each case be formed at each of the surface regions; however, the arrangement of the four capture structures at the various surfaces or surface regions could be arranged in different rotational positions in respect of an axis of rotation extending perpendicular to the surface. Then, the arrangement of the plurality of, e.g., four capture structures is uniquely identified from the respective rotational position, which is ascertainable in relation to the outer edges of the surface regions.

Reference is made to DE 10 2018 208 203 A1 in respect of further configurations of markers or target bodies with a plurality of plate-shaped portions. However, it is not mandatory for the various surface regions, at the surfaces of which at least one capture structure is embodied in each case, to be directly interconnected, as in the case of the target bodies described in DE 10 2018 208 203 A1. Rather, at least two of the surface regions can be interconnected by the object, at which the capture structures are arranged. As already mentioned, the object can be the movable object or an object that is not moved along with the movable object.

It is understood that the foregoing description is that of the exemplary embodiments of the disclosure and that various changes and modifications may be made thereto without departing from the spirit and scope of the disclosure as defined in the appended claims.

What is claimed is:

1. A method for determining a position of a movable object of an arrangement of objects, the method comprising:
    optically capturing at least one capture structure arranged at the movable object or at an object that is not moved along with the movable object thereby obtaining capture information;
    the at least one capture structure having a profile of an optical property that varies along a surface of the at least one capture structure;
    the optical property being expressible by a corresponding numerical value in accordance with a specified mapping, at least at each location along a surface direction of the at least one capture structure, and the optical property being varied such that the profile of the optical property that varies along the surface corresponds to a progression of numerical values with a plurality of local maxima and a plurality of local minima on an ordered scale of the numerical values, which is interpretable as a first mathematical function of the location;
    the optical property varying along the surface such that:
        the plurality of local maxima or all of the local maxima are values of a second mathematical function of the location along the surface direction, which has an absolute maximum corresponding to a maximum value of the optical property or an absolute minimum corresponding to a minimum value of the optical property within a local region with at least three local maxima of the first mathematical function of the location, and/or
        the plurality of local minima or all of the local minima are values of a third mathematical function of the location along the surface direction, which has the absolute maximum corresponding to the maximum value of the optical property or the absolute minimum corresponding to the minimum value of the optical property within the local region with at least three local minima of the first mathematical function of the location;
    assigning the optical property captured by the capture information corresponding numerical values in accordance with the specified mapping such that a progression of the numerical values has the plurality of local maxima and the plurality of local minima and corresponds to the first mathematical function of the location; and
    determining the position of the movable object in respect of the surface direction by performing a frequency analysis of the progression of the numerical values of the second mathematical function of the location and/or the third mathematical function of the location.

2. The method of claim 1, wherein the movable object is a component of an arrangement of components, and
    wherein the arrangement of components is a machine.

3. The method according to claim 1, wherein the profile of the optical property that varies along the surface of the at least one capture structure has a continuously changing first spatial derivative of the optical property and, accordingly, the first mathematical function of the location also has a continuously changing first derivative of the numerical values.

4. The method according to claim 1, wherein the profile of the optical property that varies along the surface of the at least one capture structure, and accordingly also the first mathematical function of the location, is periodic.

5. The method according to claim 1, wherein the at least one capture structure has a first surface direction, along which optical properties vary such that the first mathematical function has the plurality of local maxima and the plurality of local minima, and wherein the at least one capture structure has a second surface direction, which extends transversely to the first surface direction and along which the optical property does not vary such that a corresponding first mathematical function has the plurality of local maxima and the plurality of local minima.

6. The method according to claim 5, wherein:

a plurality of capture structures is optically captured and thereby corresponding capture information are obtained;

in respect of at least one pair of capture structures present, the first surface directions extend transversely to one another and/or a second surface directions extend transversely to one another;

for each capture structure of the pair of capture structures present, the optical property captured by the capture information is assigned corresponding numerical values such that the progression of the numerical values is obtained in each case with respect to at least one surface direction of the capture structure;

the progression of the numerical values for each capture structure of the pair present in respect of the at least one surface direction of the capture structure, which is an evaluation device of the capture structure; and a first evaluation device of a first capture structure of the pair differs from a second evaluation device of a second capture structure of the pair.

7. An arrangement for determining a position of a movable object of an arrangement of objects, the arrangement comprising:

at least one capture structure arrangeable at the movable object or at an object that is not moved along with the movable object;

a capturing device configured to optically capture the at least one capture structure and to thereby obtain capture information;

the at least one capture structure having a profile of an optical property that varies along a surface of the at least one capture structure;

the optical property being expressible by a corresponding numerical value in accordance with a specified mapping, at least at each location along a surface direction of the at least one capture structure, and said optical property being varied such that the profile of the optical property that varies along the surface corresponds to a progression of numerical values with a plurality of local maxima and a plurality of local minima on an ordered scale of the numerical values, which is interpretable as a first mathematical function of the location;

the optical property varying along the surface such that:

the plurality of local maxima or all of the local maxima are values of a second mathematical function of the location along the surface direction, which has an absolute maximum corresponding to a maximum value of the optical property or an absolute minimum corresponding to a minimum value of the optical property within a local region with at least three local maxima of the first mathematical function of the location, and/or the plurality of local minima or all of the local minima are values of a third mathematical function of the location along the surface direction, which has the absolute maximum corresponding to the maximum value of the optical property or the absolute minimum corresponding to the minimum value of the optical property within the local region with at least three local minima of the first mathematical function of the location;

an evaluation device, wherein the evaluation device or the capturing device is configured to assign to the optical property captured by the capture information corresponding numerical values in accordance with the specified mapping such that a progression of the numerical values has the plurality of local maxima and the plurality of local minima and corresponds to the first mathematical function of the location; and the evaluation device being configured to determine the position of the movable object in respect of the surface direction by performing a frequency analysis of the progression of the numerical values of the second mathematical function of the location and/or the third mathematical function of the location.

8. The arrangement according to claim 7, wherein the movable object is a component of an arrangement of components, and wherein the arrangement of components is a machine.

9. The arrangement according to claim 7, wherein the profile of the optical property that varies along the surface of the at least one capture structure has a continuously changing first spatial derivative of the optical property and, accordingly, the first mathematical function of the location also has a continuously changing first derivative of the numerical values.

10. The arrangement according to claim 7, wherein the profile of the optical property that varies along the surface of the at least one capture structure, and accordingly also the first mathematical function of the location, is periodic.

11. The arrangement according to claim 7, wherein the at least one capture structure has a first surface direction, along which the optical property varies such that the first mathematical function has the plurality of local maxima and the plurality of local minima, and wherein the at least one capture structure has a second surface direction, which extends transversely to the first surface direction and along which the optical property does not vary such that a corresponding first mathematical function has the plurality of local maxima and the plurality of local minima.

12. The arrangement according to claim 11, further comprising:

a plurality of capture structures, wherein:

the capturing device is configured to optically capture the plurality of capture structures and to thereby obtain corresponding capture information, in respect of at least one pair of capture structures present, the first surface directions extend transversely to one another and/or a second surface directions extend transversely to one another, the evaluation device or the capturing device is configured to:

for each capture structure of the pair present, assign to the optical property captured by the capture information corresponding numerical values such that the progression of the numerical values is obtained in each case with respect to at least one surface direction of the capture structure, evaluate the progression of the numerical values for each captured structure of the pair present in respect of the at least one surface direction of the capture structure, which is the evaluation device of the capture structure, and a first evaluation device of a first capture structure of the pair differs from a second evaluation device of a second capture structure of the pair.

13. A capture structure for determining a position of a movable object of an arrangement of objects by virtue of the capture structure being connected either to the movable object or to a capturing device that is not moved along with the movable object, the capture structure being captured and corresponding capture information in respect of the position of the movable object being evaluated, the capture structure comprising:

a profile of an optical property that varies along a surface of the capture structure;

the optical property being expressible by a corresponding numerical value in accordance with a specified mapping, at least at each location along a surface direction of the capture structure, and the optical property being varied such that the profile of the optical property that varies along the surface corresponds to a progression of numerical values with a plurality of local maxima and a plurality of local minima on an ordered scale of the numerical values, which is interpretable as a first mathematical function of the location;

the optical property varying along the surface such that:

the plurality of local maxima or all of the local maxima are values of a second mathematical function of the location along the surface direction, which has an absolute maximum at a unique location corresponding to a maximum value of the optical property or an absolute minimum at the unique location corresponding to a minimum value of the optical property within a local region with at least three local maxima of the first mathematical function of the location, and/or the plurality of local minima or all of the local minima are values of a third mathematical function of the location along the surface direction, which has the absolute maximum at a first unique location corresponding to the maximum value of the optical property or the absolute minimum at a second unique location corresponding to the minimum value of the optical property within the local region with at least three local minima of the first mathematical function of the location.

14. The capture structure according to claim 13, wherein the movable object is a component of an arrangement of components, and wherein the arrangement of components is a machine.

15. A method for producing a capture structure which serves to determine a position of a movable object of an arrangement of objects by virtue of the capture structure being connected either to the movable object or to a capturing device that is not moved along with the movable object, the capture structure being captured and corresponding capture information in respect of the position of the movable object being evaluated, the capture structure being configured such that (i) the capture structure has a profile of an optical property that varies along a surface of the capture structure, and (ii) the optical property is expressible by a corresponding numerical value in accordance with a specified mapping, at least at each location along a surface direction of the capture structure, and the optical property is varied such that the profile of the optical property that varies along the surface corresponds to a progression of numerical values with a plurality of local maxima and a plurality of local minima on an ordered scale of the numerical values, which is interpretable as a first mathematical function of the location, the optical property varies along the surface such that (iii) the plurality of local maxima or all of the local maxima are values of a second mathematical function of the location along the surface direction, which has an absolute maximum corresponding to a maximum value of the optical property or an absolute minimum corresponding to a minimum value of the optical property within a local region with at least three local maxima of the first mathematical function of the location, and/or (iv) the plurality of local minima or all of the local minima are values of a third mathematical function of the location along the surface direction, which has the absolute maximum corresponding to the maximum value of the optical property or the absolute minimum corresponding to the minimum value of the optical property within the local region with at least three local minima of the first mathematical function of the location, the method comprising:

producing the capture structure by at least one of:

digital printing methods, methods of partial material removal of surface material, and methods in which material is applied to the surface or generated by displaying the capture structure on a display or projecting the capture structure on the surface.

16. The method of claim 15, wherein the movable object is a component of an arrangement of components, and wherein the arrangement of components is a machine.

17. The method according to claim 15, further comprising:

specifying at least one frequency, according to which the profile of the optical property of the capture structure has a periodic configuration.

18. The method according to claim 17, wherein a frequency range or ranges in a frequency spectrum in which an effect has an effect is/are determined for at least one effect which has an unintended influence on the frequency spectrum of the profile of the optical property, and wherein a frequency is specified such that it is not located in the determined frequency range or in the determined frequency ranges.

19. A method for producing an arrangement which serves to determine a position and/or alignment of a movable object of an arrangement of objects, the method comprising:

equipping the arrangement with at least one capture structure, the at least one capture structure serving to be arranged at the movable object or at an object that is not moved along with the movable object;

equipping the arrangement with a capturing device for capturing the at least one capture structure or for capturing at least one of the capture structures;

the capturing device being configured to optically capture the at least one capture structure and to thereby obtain capture information;

the at least one capture structure having a profile of an optical property that varies along a surface of the at least one capture structure;

the optical property being expressible by a corresponding numerical value in accordance with a specified mapping, at least at each location along a surface direction of the at least one capture structure, and the optical property being varied such that the profile of the optical property that varies along the surface corresponds to a progression of numerical values with a plurality of local maxima and a plurality of local minima on an ordered scale of the numerical values, which is interpretable as a first mathematical function of the location;

the optical property varying along the surface such that:

the plurality of local maxima or all of the local maxima are values of a second mathematical function of the location along the surface direction, which has an absolute maximum corresponding to a maximum value of the optical property or an absolute minimum corresponding to a minimum value of the optical property within a local region with at least three local maxima of the first mathematical function of the location, and/or the plurality of local minima or all of the local minima are values of a third mathematical function of the location along the surface direction, which has the absolute maximum corresponding to the maximum value of the optical property or the absolute minimum corresponding to the minimum value of the optical property within the local region with at least three local minima of the first mathematical function of the location;

equipping the arrangement with an evaluation device, the evaluation device or the capturing device being configured to assign to the optical property captured by the capture information corresponding numerical values in accordance with the specified mapping such that a progression of the numerical values has the plurality of local maxima and the plurality of local minima and corresponds to the first mathematical function of the location; and configuring the evaluation device to determine the position of the movable object in respect of the surface direction by performing a frequency analysis of the progression of the numerical values of the second mathematical function of the location and/or the third mathematical function of the location.

20. The method of claim 19, wherein the movable object is a component of an arrangement of components, and wherein the arrangement of components is a machine.

\* \* \* \* \*